United States Patent [19]

Okuno et al.

[11] Patent Number: 5,664,249
[45] Date of Patent: Sep. 2, 1997

[54] CAMERA OR APPARATUS ADAPTED TO USE FILM CARTRIDGE OR DEVICE APPLICABLE TO SUCH CAMERA OR APPARATUS

[75] Inventors: Ryoji Okuno; Makoto Miyawaki, both of Kanagawa-ken, Japan

[73] Assignee: Canon Kabushiki Kaisha, Tokyo, Japan

[21] Appl. No.: 364,730

[22] Filed: Dec. 27, 1994

[30] Foreign Application Priority Data

Dec. 30, 1993 [JP] Japan .................. 5-350365

[51] Int. Cl.⁶ ............................................. G03B 17/02
[52] U.S. Cl. ................................................ 396/538
[58] Field of Search ........................... 354/174, 275, 354/288; 396/535, 538

[56] References Cited

U.S. PATENT DOCUMENTS

| | | | |
|---|---|---|---|
| 4,469,421 | 9/1984 | Kamata | 354/288 |
| 4,841,319 | 6/1989 | Hansen | 354/288 |
| 5,155,514 | 10/1992 | Tamamura . | |
| 5,305,039 | 4/1994 | Dassero | 354/288 |

Primary Examiner—David M. Gray
Attorney, Agent, or Firm—Robin, Blecker, Daley & Driscoll

[57] ABSTRACT

A camera or an apparatus, or a device applicable to the camera or the apparatus, adapted to use a film cartridge includes a cover for a slidable cartridge loading chamber, a first part arranged to support the film cartridge when the film cartridge is placed in the cartridge loading chamber and a second part arranged to prevent the first part from hindering the sliding action of the cover.

52 Claims, 18 Drawing Sheets

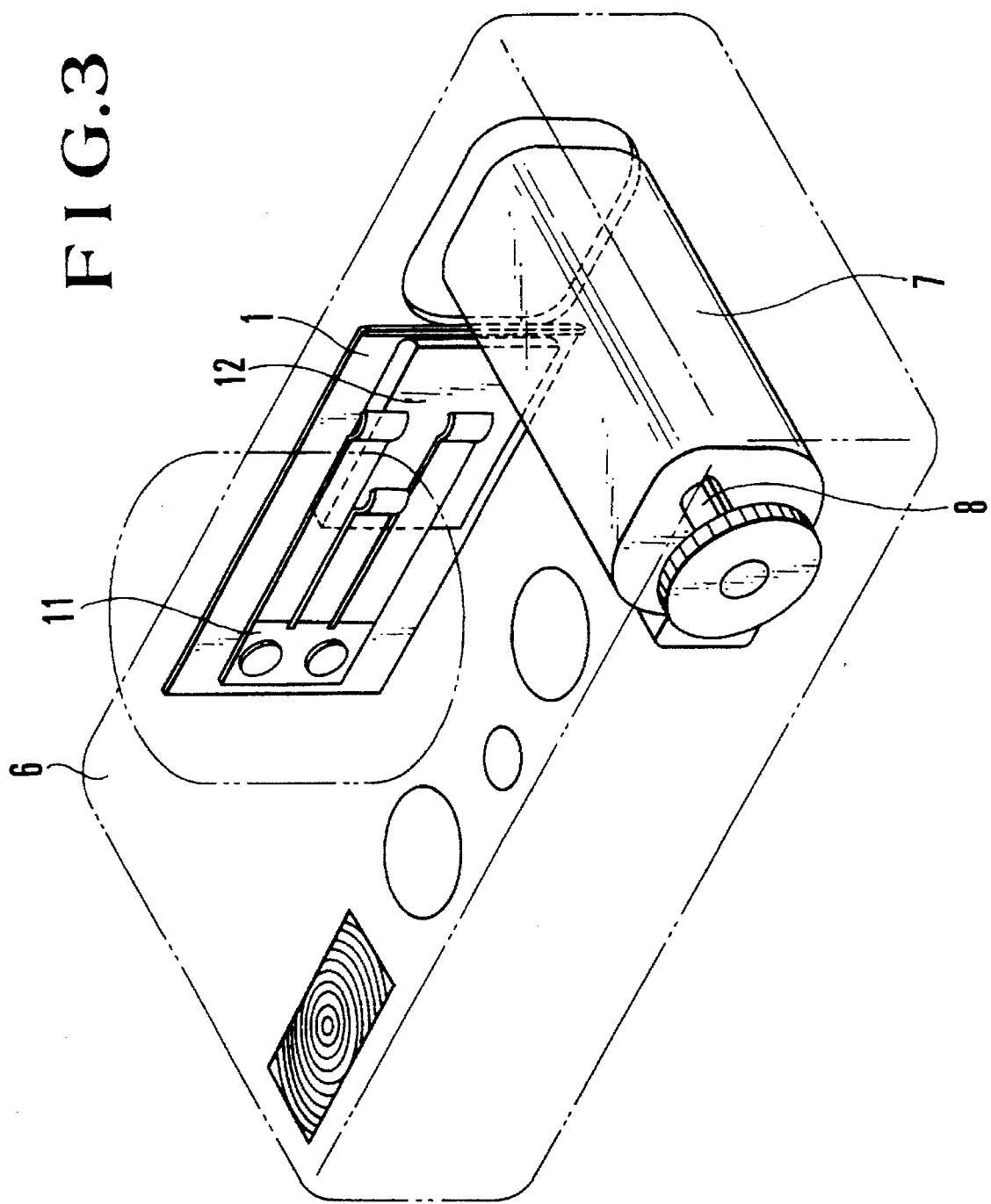

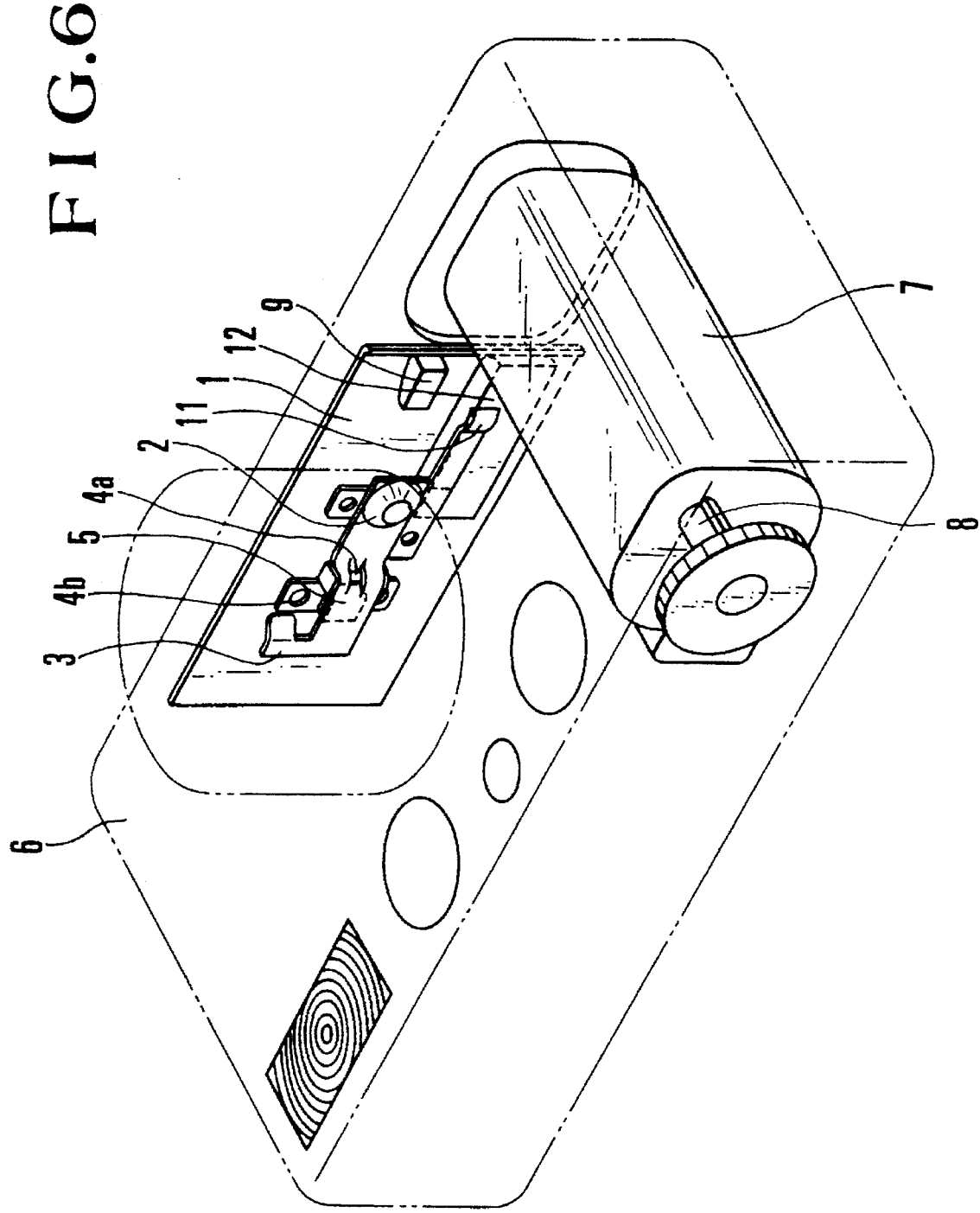

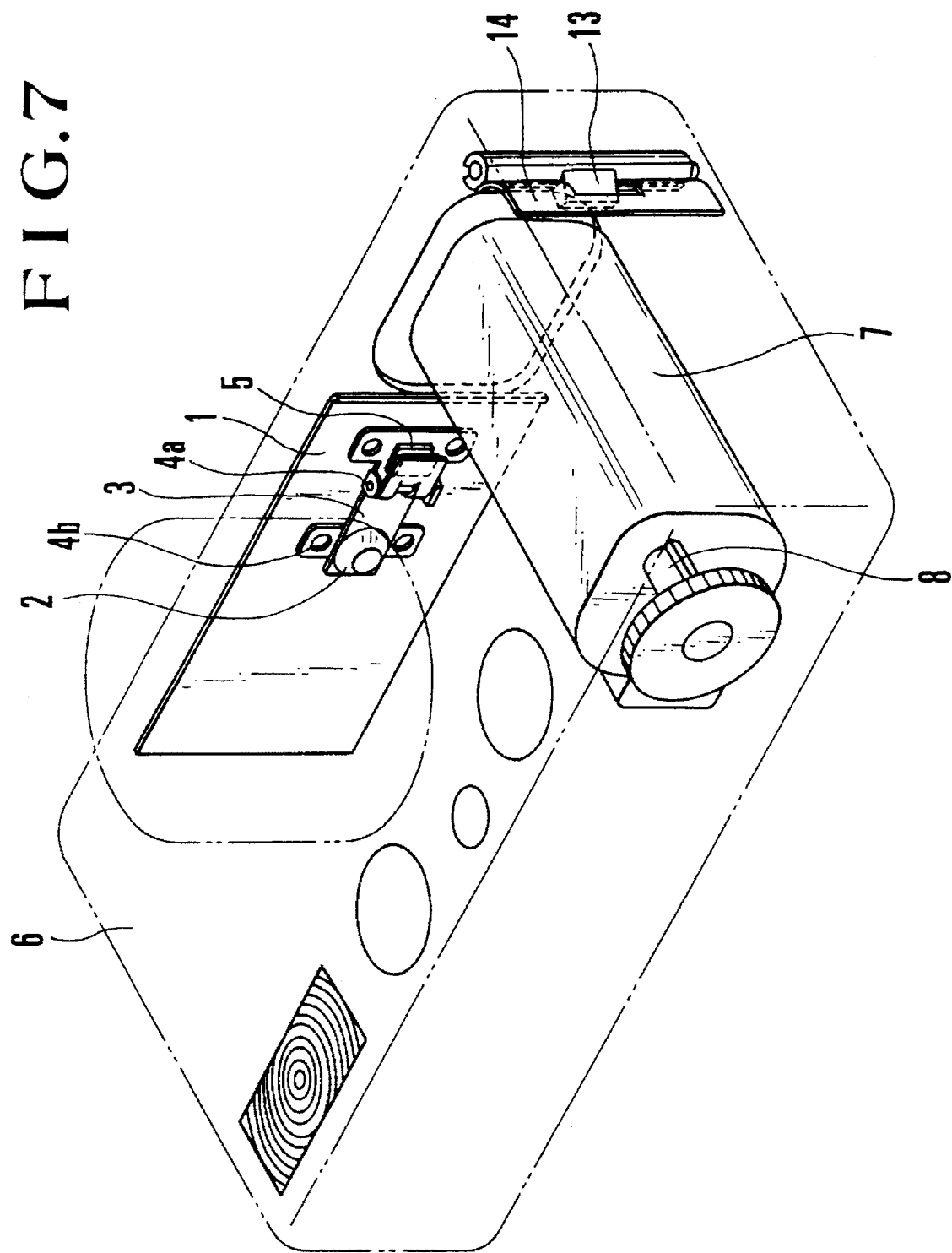

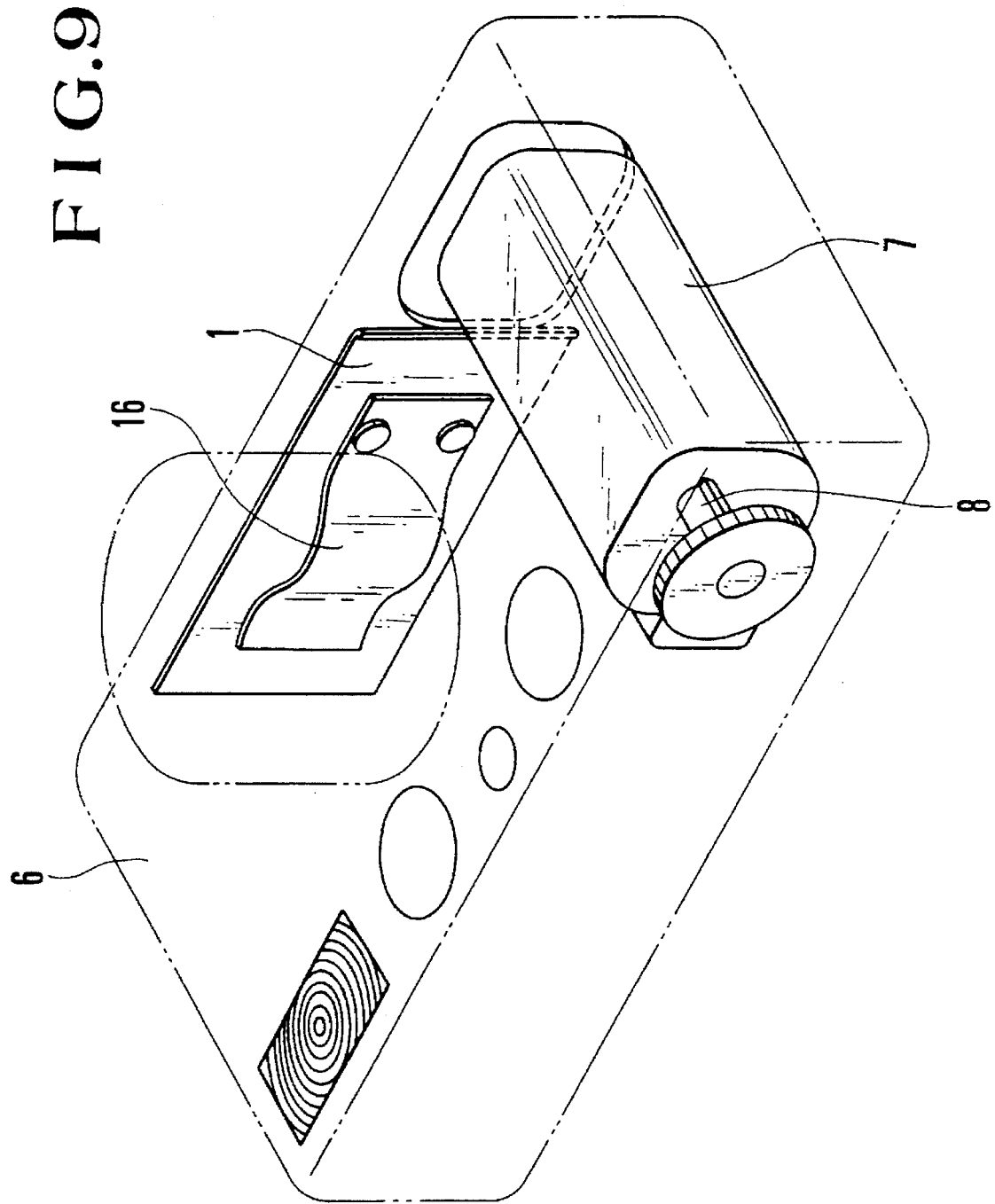

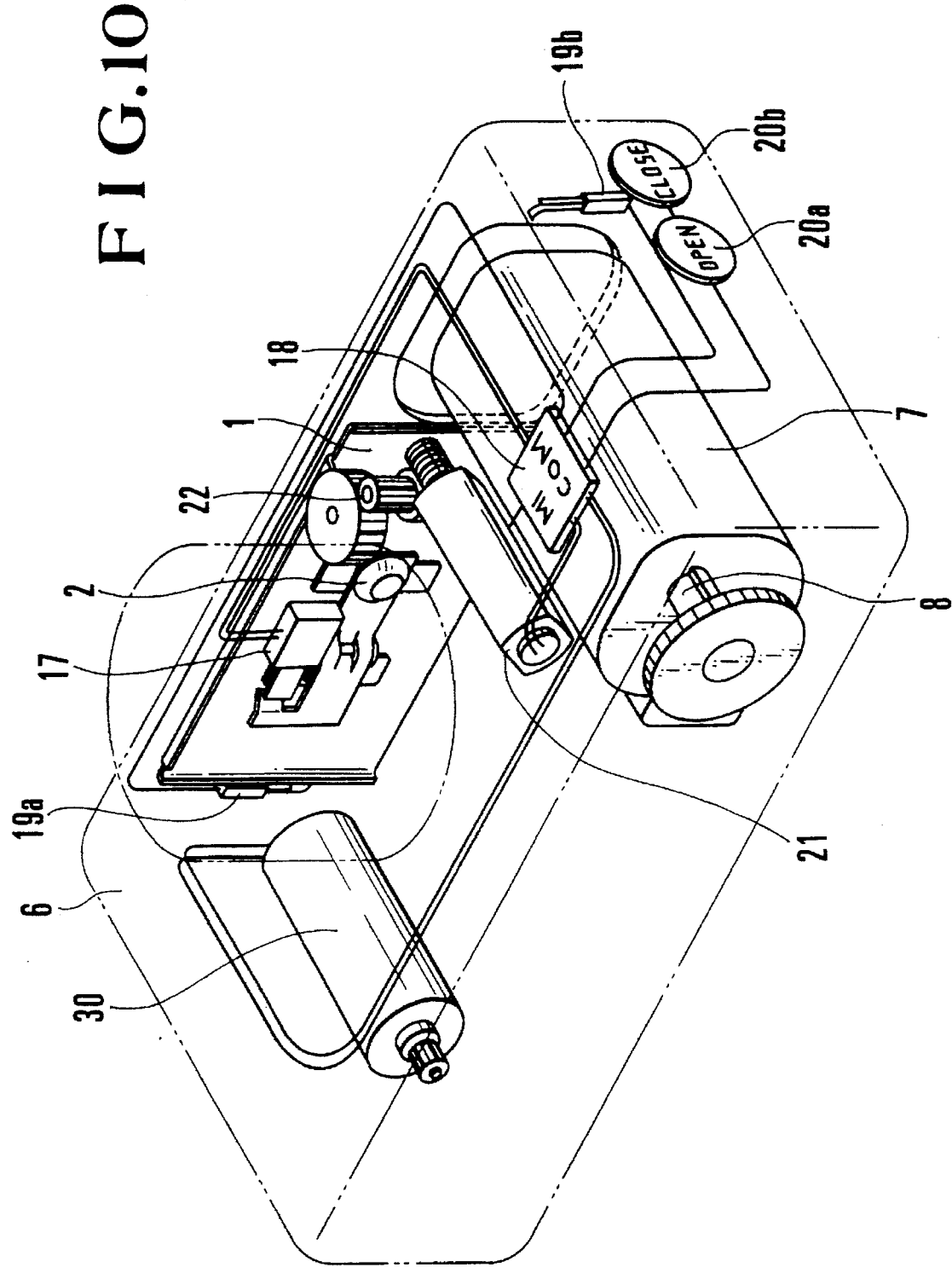

CAMERA OR APPARATUS ADAPTED TO USE FILM CARTRIDGE OR DEVICE APPLICABLE TO SUCH CAMERA OR APPARATUS

BACKGROUND OF THE INVENTION

1. Field of the Invention

This invention relates to an apparatus such as a camera or the like adapted to use a film cartridge and more particularly to a device for loading or unloading the film cartridge on or from the apparatus.

2. Description of the Related Art

Generally a film cartridge adapted for cameras have some play between a spool disposed within the film cartridge and the shell of the film cartridge. It has been, therefore, hardly possible to keep a film cartridge accurately in position on a camera due to the vertical rattling of a spool and the tilting of its axis taking place within the cartridge while the film is in process of transportation, although the cartridge shell is set in position when the film cartridge is loaded on the camera.

Meanwhile film cartridges of varied kinds have recently been proposed. One example of them, disclosed in Japanese Laid-Open Patent Application No. HEI 3-75637, is arranged as shown in FIG. 17. As shown, when a film 52 contained in a cartridge 50 is in an initial state and has not been exposed, its leader part remains also within the cartridge 50 in a state of being blocked from light.

In using this cartridge 50 for a camera, a spool 51 which is disposed within the cartridge 50 is rotated by a film transport mechanism of the camera to move the film 52 out of the cartridge 50 by thrust driving. In this instance, the film must be accurately sent out and moved in between an aperture and a pressing plate of the camera without slanting the film too much.

Further, a camera system disclosed, for example, in U.S. Pat. No. 4,864,332 is arranged not only to expose a film to light to optically take a shot of a scene but also to have a magnetic recording area in a part of the film surface and to magnetically record or read out information of varied kinds on or from the recording area while the film is in process of transportation. However, in the case of the camera of this kind, it is necessary for accurate magnetic recording or reading to have the film come to a magnetic head at a stable entrance angle in sending the film out of a film cartridge. In cases where information of varied kinds is to be optically recorded in the form of dots or lines, instead of magnetic recording, the film also must be stably sent out from the cartridge.

This requirement can be hardly met by the conventional arrangement of carrying the spool of a film cartridge only at one end of it (with a fork arranged to engage one end of it), like the conventional 35 mm film containing cartridge. The conventional arrangement hardly ensures an adequate entrance angle at which the film comes in between the aperture and the pressing or pushing plate and hardly prevents the film from vertically rattling while the film is in process of transportation. In order to accurately keep the cartridge in position within the camera, the end of the spool must be carried with a severer degree of dimensional precision.

In the case of the camera 54 as shown in FIG. 18 the lid 53 of a cartridge chamber 55 is arranged to be opened and closed by sliding it approximately in parallel to the driving plane of the spool 51. Practice has been to provide the cartridge chamber lid 53 with a plastic protection arranged to hold the other end of the cartridge 50. However, the projection hinders the sliding motion of the cartridge chamber lid 53. Besides, with differences in dimension among individual cartridges, an error in inserting the cartridge 50, the play provided for sliding the cartridge chamber lid 53, a dimensional error existing within the cartridge chamber 55, etc. taken into consideration, they add up to a large tolerance requiring a considerably large space, even if the dimensions relative to the cartridge chamber lid 53 are minimized within the range of tolerance. Therefore, the play or rattling of the cartridge which takes place within the camera can be hardly reduced by such arrangement.

SUMMARY OF THE INVENTION

It is one aspect of this invention to provide a camera or an apparatus adapted to use a film cartridge, or a device applicable to the camera or the apparatus, which is arranged to be capable of solving the problems of the prior art described in the foregoing. The camera or the apparatus according to this invention is provided with first means arranged on a slidable cover of a cartridge loading chamber to support the film cartridge when the film cartridge is placed in the cartridge loading chamber and second means for preventing the first means from hindering the sliding action of the cover, so that the cover can be smoothly slid and the film cartridge can be adequately carried within the cartridge loading chamber.

The above and other aspects and features of this invention will become apparent from the following detailed description of embodiments thereof taken in conjunction with the accompanying drawings.

BRIEF DESCRIPTION OF THE DRAWINGS

FIG. 3 is a partly look-through oblique view of a camera which is a second embodiment of this invention.

FIG. 6 is a partly look-through oblique view of a camera which is a fourth embodiment of this invention.

FIG. 7 is a partly look-through oblique view of a camera which is a fifth embodiment of this invention.

FIG. 9 is a partly look-through oblique view of a camera which is a sixth embodiment of this invention.

FIG. 10 is a partly look-through oblique view of a camera which is a seventh embodiment of this invention.

DETAILED DESCRIPTION OF THE PREFERRED EMBODIMENTS

The following describes preferred embodiments of this invention with reference to the drawings.

Figure 1:
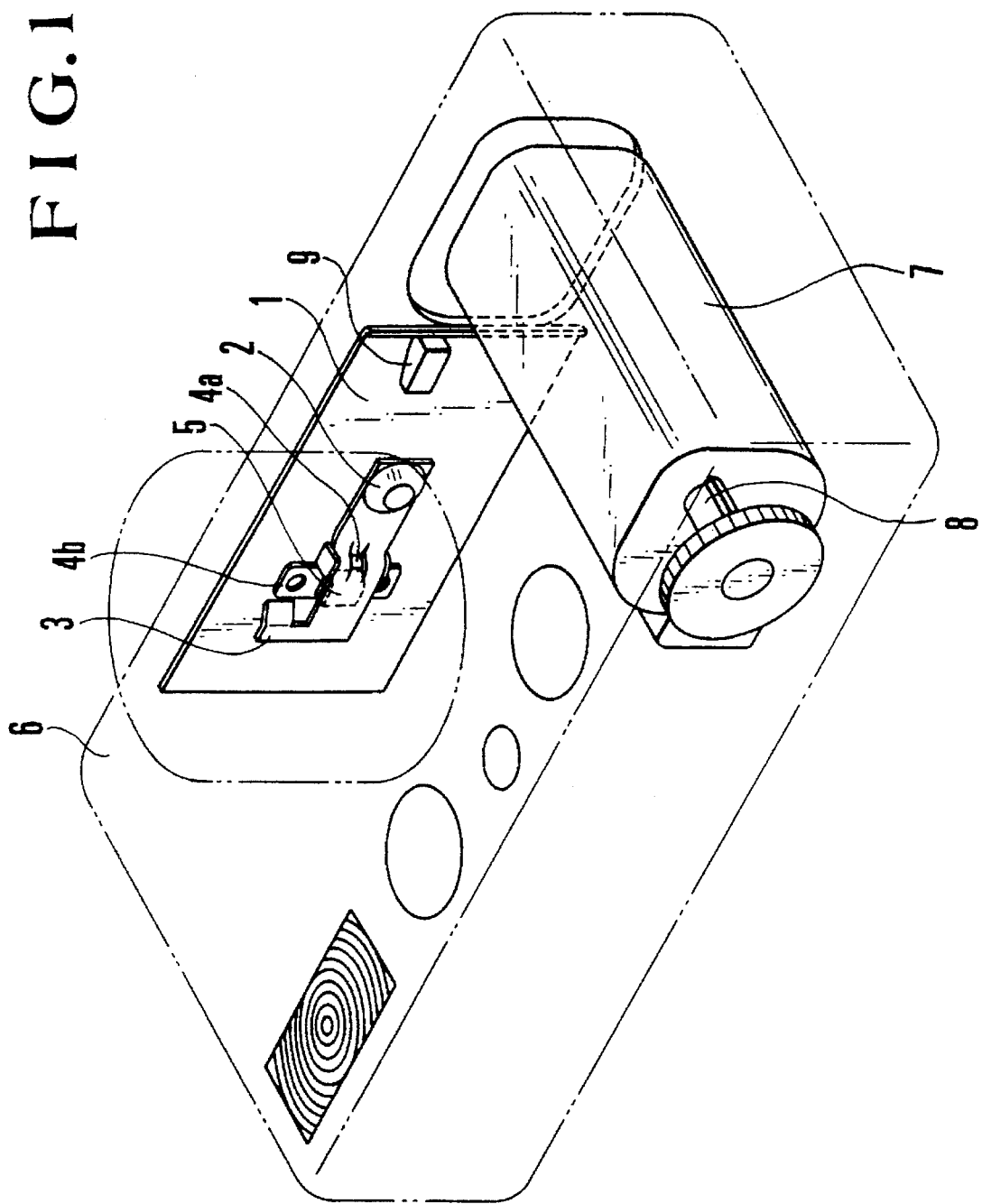
FIG. 1 is a partly look-through oblique view of a camera which is a first embodiment of this invention.
Figure 2A:
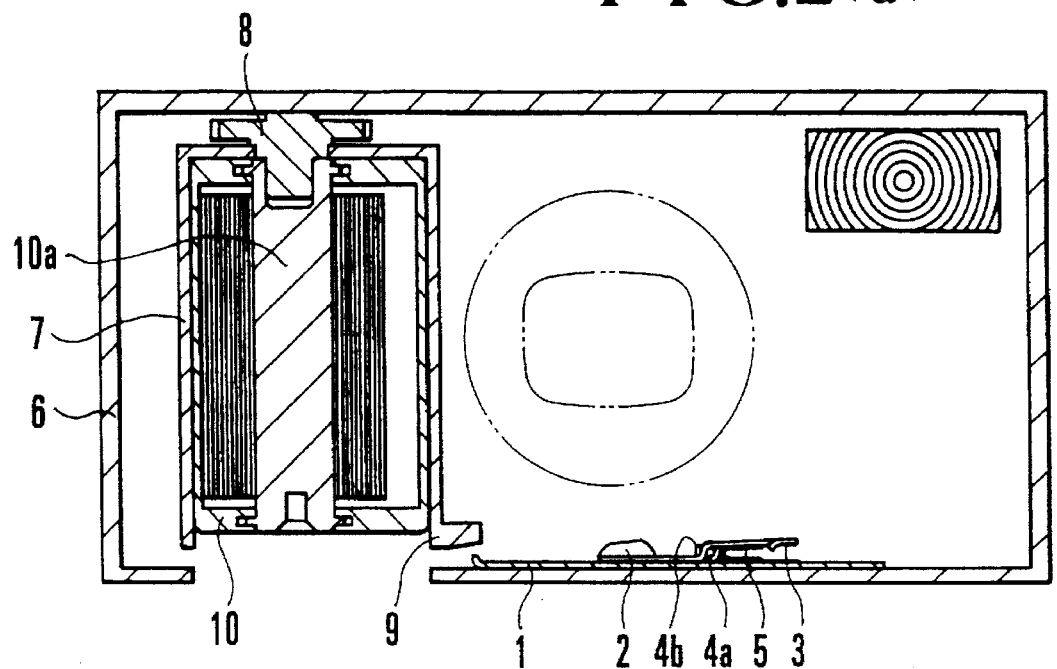
FIGS. 2(a), 2(b) and 2(c) are sectional views of the camera shown in FIG. 1.
Figure 2B:
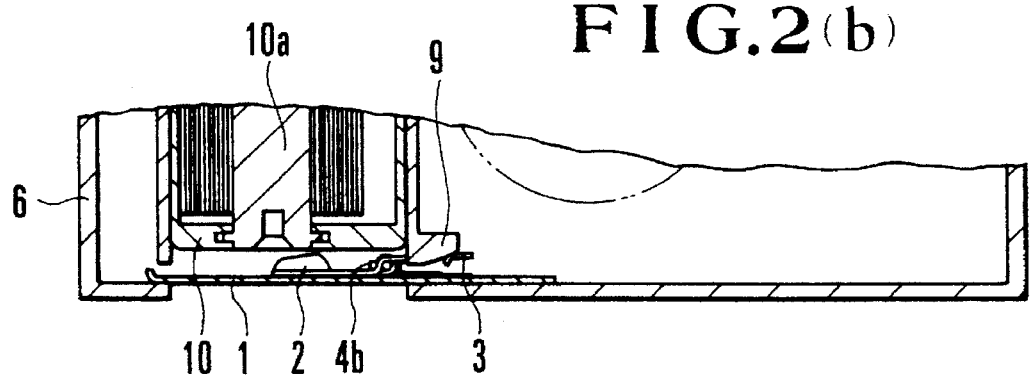
Figure 2C:
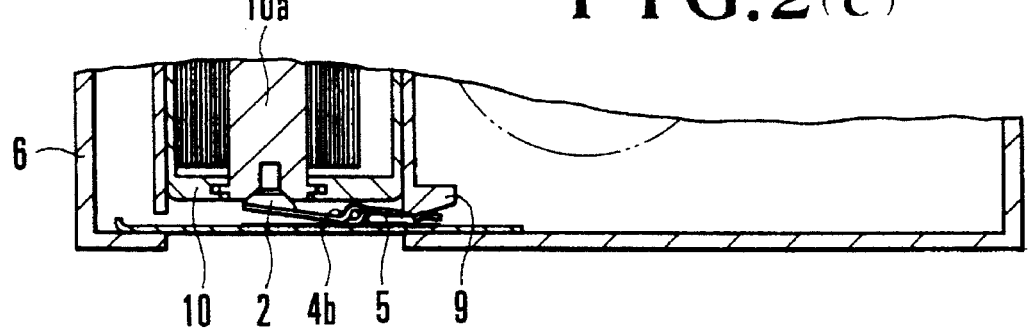

FIGS. 1 and 2 show a camera arranged as a first embodiment of this invention. FIG. 1 is an oblique view showing a part of a camera in a look-through manner. FIG. 2 shows the camera in sectional views including FIG. 2(a), FIG. 2(b) and FIG. 2(c).

Referring to FIGS. 1 and 2, a cartridge chamber 7 is provided with a lid 1 which is movable approximately in parallel to an end face of film cartridge. The cartridge chamber lid 1 is arranged to be driven to slide within a camera body 6 in such a way as to open and close the cartridge (loading) chamber 7. These illustrations include a cartridge axis defining projection part 2, a lever member 3 which is made of an elastic metal material, and a support bar 4a. The support bar 4a is arranged to pivotally carry and rotatably connect the lever member 3 to a support base 4b which is secured to the cartridge chamber lid 1. An urging spring 5 is arranged to urge the lever member 3 to swing counterclockwise on the support bar 4a, as viewed on FIGS. 1 and 2. A fork 8 is a part of film transport means disposed within the camera body and is arranged to drive a spool 10a disposed within the film cartridge 10. A cam part 9 is fixed in place within the camera body.

FIG. 2(a) shows the cartridge chamber 7 in an open state. With the cartridge chamber 7 in this state, the cartridge 10 is inserted into the cartridge chamber 7 until the upper end (one end) of the spool 10a of the film cartridge 10 comes to engage the fork 8.

When the cartridge chamber lid 1 is moved either by hand or by a motor or the like in the direction of closing the cartridge chamber from its position shown in FIG. 2(a), the cartridge chamber comes to be half open as shown in FIG. 2(b). In the state of FIG. 2(b), the lever member 3 has been swung counterclockwise to a first position over the cartridge chamber lid 1 by the urging spring 5. In the first position, the lever member 3 engages the cam part 9. When the cartridge chamber lid 1 is moved further in the closing direction, the lever part 3 is pushed by the cam part 9 to swing clockwise on the support bar 4a which is secured to the cartridge chamber lid 1 as the cartridge chamber lid closing force is larger than the force of the urging spring 5. The cartridge axis defining projection part 2 which is disposed at one end of the lever member 3 then begins to rise accordingly as the lever member 3 swings. The cartridge chamber lid 1 then completely closes the cartridge chamber 7 as shown in FIG. 2(c). When the cartridge chamber 7 is closed as shown in FIG. 2(c), the cartridge axis defining projection part 2 is in its second position where it completely engages the lower end (or the other end) of the spool 10a of the film cartridge 10. Since the lever member 3 is made of an elastic material in this instance, even if the cartridge axis defining projection part 2 happens to overshoot the lower end face of the spool 10a, the flexibility of the lever member 3 ensures that the spool 10a is carried at both ends thereof in an ideal manner by virtue of the elasticity of the lever member 3.

In opening the cartridge chamber lid 1 (the cartridge chamber 7), the vertical motion of lever member 3 from its second position to its first position can be accomplished in a short range of the opening/closing action of the cartridge chamber lid 1 as the cartridge axis defining projection part 2 then acts as a plastic body and also by virtue of the cam member 9. Further, since the lever member 3 is elastic, the cartridge axis defining projection part 2 pulls off the surface (on the bottom side) of the spool 2a while sliding over it to pull off also the cam member 9 and is brought back to its first position on the cartridge chamber lid 1 by the force of the urging spring 5. Therefore, the cartridge axis defining projection part 2 moves from its position of FIG. 2(c) back to its position of FIG. 2(a) without giving any damage to the (film) cartridge 10.

In the case of the first embodiment described above, the spool 10a of the film cartridge 10 is arranged to be carried at both of its two ends by utilizing a driving section of the cartridge chamber lid 1 remaining after the lever member 3 disposed on the cartridge chamber lid 1 comes to abut on the cam member 9. The arrangement of the first embodiment, therefore, enhances the precision of the position of the spool 10a within the camera.

Projection part 2, lever member 3, support bar 4a and support base 4b will be seen to constitute a first device or first means which supports the film cartridge placed in the cartridge chamber, the first device being arranged on a slidable cover 1 of a cartridge chamber, camera cam part 9 being cooperative with the first device, as shown in FIG. 2(c). Urging spring 5 causes lever member 3 to swing counterclockwise on support bar 4a and will be seen to constitute a second device or second means which prevents the first device from hindering a sliding action of the cover because of the film cartridge placed in the cartridge chamber.

Figure 4A:
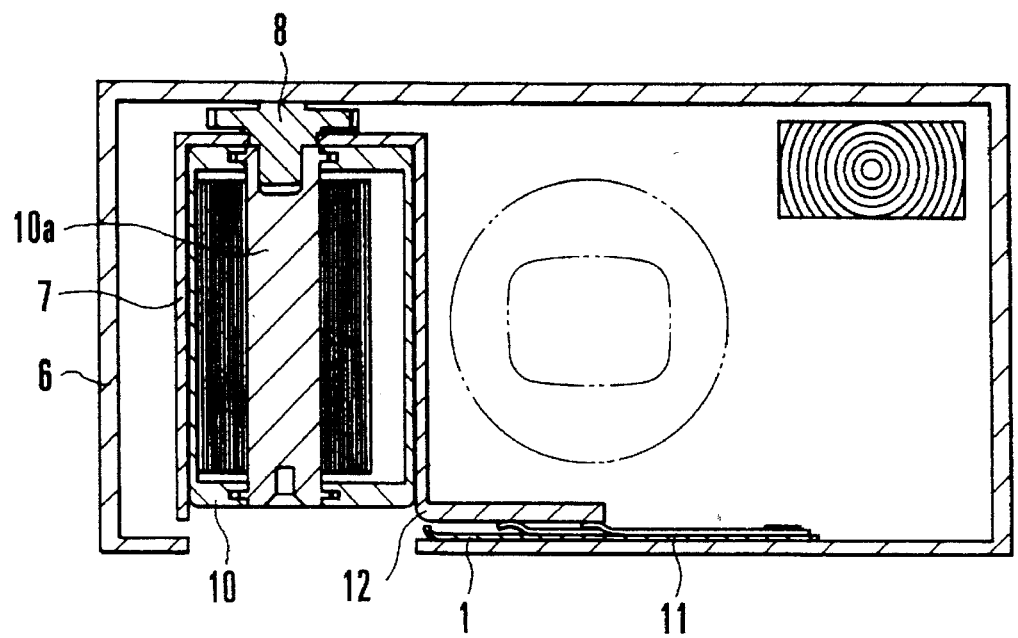
FIGS. 4(a), 4(b) and 4(c) are sectional views of the camera shown in FIG. 3.
Figure 4B:
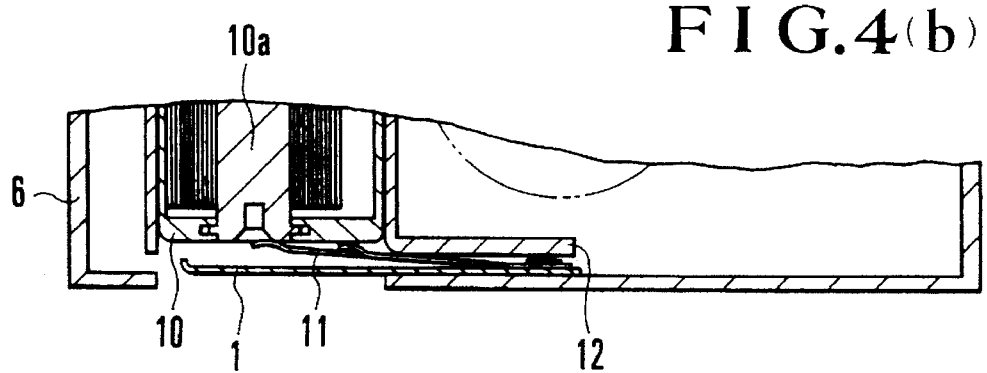
Figure 4C:
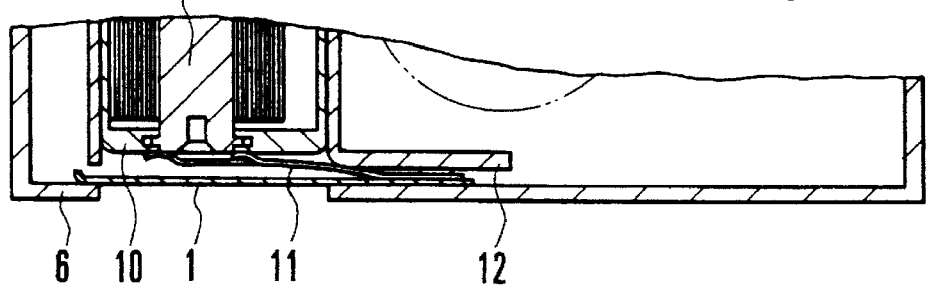

FIGS. 3 and 4 relate to a second embodiment of this invention. FIG. 3 is a partly look-through oblique view of a camera arranged as the second embodiment. FIG. 4 shows the second embodiment in sectional views including FIG. 4(a), 4(b) and 4(c). In these figures, the parts arranged in the same manner as those of the first embodiment are indicated by the same reference numerals.

Referring to FIGS. 3 and 4, a cartridge chamber lid 1 is arranged to be driven within a camera body 6 to slide to open and close a cartridge chamber 7, which is arranged for receipt of a film cartridge 10. A leaf spring 11 which is made of an elastic metal material is caulked to the cartridge chamber lid 1. A fork 8 which is a part of film transport means disposed within the camera is arranged to drive the spool 10a which is disposed within the film cartridge 10. A protruding member 12 is disposed in the neighborhood of the cartridge chamber 7.

The cartridge chamber 7 is arranged to be opened and closed by slidingly driving the cartridge chamber lid 1 with the camera body 6.

When the cartridge chamber lid 1 is in a cartridge chamber opening position as shown FIG. 4(a), the camera is loaded with the film cartridge 10. In this instance, the film cartridge 10 is inserted into the cartridge chamber 7 until the upper end of the spool 10a of the film cartridge 10 engages the fork 8. The fore end of the leaf spring member 11 is sandwiched in between the protruding member 12 and the cartridge chamber lid 1 and is in a position not touching the cartridge 10.

When the cartridge chamber lid 1 is moved either by hand or by means of a motor in the direction of closing the cartridge chamber 7, there obtains a cartridge chamber lid half open state as shown in FIG. 4(b). In this state, the leaf spring member 11 which is disposed on the cartridge chamber lid 1 comes close to its initial annealed state. This is because the fore end of the leaf spring member 11 is liberated and a part of it located further than the protruding member 12 tries to resume its original shape. When the cartridge chamber lid 1 is moved further in the closing direction, the leaf spring member 11 is completely liberated with the cartridge chamber completely covered and closed as shown in FIG. 4(c). In this state, the fore end of the leaf spring member 11 catches the bottom face of the cartridge 10 and further elastically pushes it in such a way as to push the lower end of the spool 10a against the fork 8. The leaf spring member 11 thus comes to support the cartridge 10.

In opening the cartridge chamber lid 1, the Leaf spring member 11 slides over the bottom face of the cartridge 10 for a very short interval where the cartridge pushing force of the leaf spring member 11 disappears. The leaf spring member 11 is then pushed by the force of opening the cartridge chamber lid 1 down below the protruding member 12. The cartridge chamber lid 1 is thus opened in a charged state. In other words, the cartridge chamber lid 1 moves from the state of FIG. 4(c) back to the state of FIG. 4(a) through the state of FIG. 4(b).

As described above, the second embodiment is arranged to push the cartridge 10 with the leaf spring member 11 disposed on the cartridge chamber lid 1 by utilizing a section where the leaf spring member 11 is moving away from a position at which the protruding member 12 is abutting thereon. This arrangement enhances the accuracy of position of the spool 10a within the camera.

Further, since the sliding extent (section) of the leaf spring member 11 over the bottom face of the cartridge can be shortened by the arrangement, the cartridge is less likely damaged by the sliding contact. In this context, the leaf spring member can be viewed as a slide member.

Leaf spring member 11 will be seen to constitute a first device or first means which supports the film cartridge placed in the cartridge chamber, the first device being arranged on a slidable cover 1 of a cartridge chamber. Protruding member 12 operates on leaf spring member 11 in the course of closing lid 1 to dispose it, against its bias, out of interference with the film cartridge, as in FIG. 4(a) and will be seen to constitute a second device or second means which prevents the first device from hindering a sliding action of the cover because of the film cartridge placed in the cartridge chamber.

Figure 5:
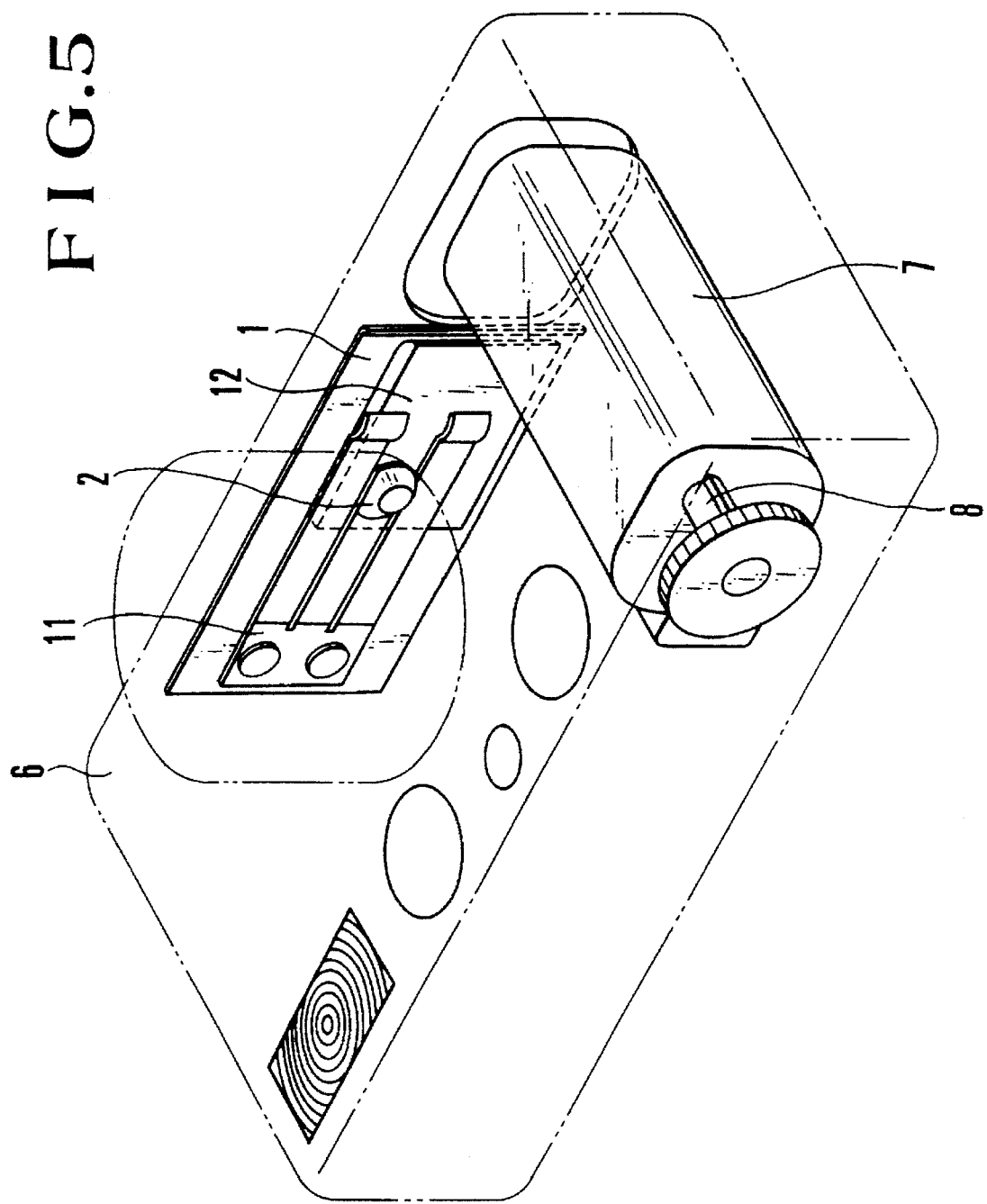
FIG. 5 is a partly look-through oblique view of a camera which is a third embodiment of this invention.

FIG. 5 is a partly look-through oblique view of a camera which is arranged as a third embodiment of this invention. In FIG. 5, the same parts as those shown in FIGS. 1 to 4 are indicated by the same reference numerals. In this case, a cartridge axis defining projection part 2 which is shown also in FIG. 1, etc. is arranged at the fore end of the leaf spring member 11 of the second embodiment. This arrangement enables the third embodiment to stably carry the spool 10a at its two ends in the same manner as in the case of the first embodiment.

FIG. 6 is a partly look-through oblique view of a camera which is arranged as a fourth embodiment of this invention. In FIG. 6, the same parts as those shown in FIGS. 1 to 4 are indicated by the same reference numerals.

The fourth embodiment is arranged to combine the arrangement of the first embodiment and that of the second embodiment. This arrangement enables the fourth embodiment to attain the same advantage as that of the third embodiment.

FIGS. 7 and 8 relate to a camera which is a fifth embodiment of this invention. FIG. 7 is a partly look-through oblique view of the camera. FIG. 8 includes sectional views 8(a), 8(b) and 8(c) showing the camera as in different states. Referring to FIGS. 7 and 8, a cartridge chamber lid 1 is arranged to be driven to slide within a camera body 6 for opening and closing a cartridge chamber 7 which is arranged to allow a film cartridge to be placed therein. The illustrations show a cartridge axis defining projection part 2, a lever member 3 which is made of an elastic metal material, a support bar 4a, a support base 4b, an urging spring 5, the camera body 6, the cartridge chamber 7, a fork 8 which is arranged as a part of film transport means to drive a spool 10a which is disposed within the film cartridge 10, a swinging member 13 which has two locking positions including first and second locking positions, and an elastic locking member 14 which is arranged to restrict the two locking positions of the swinging member 13.

Figure 8A:
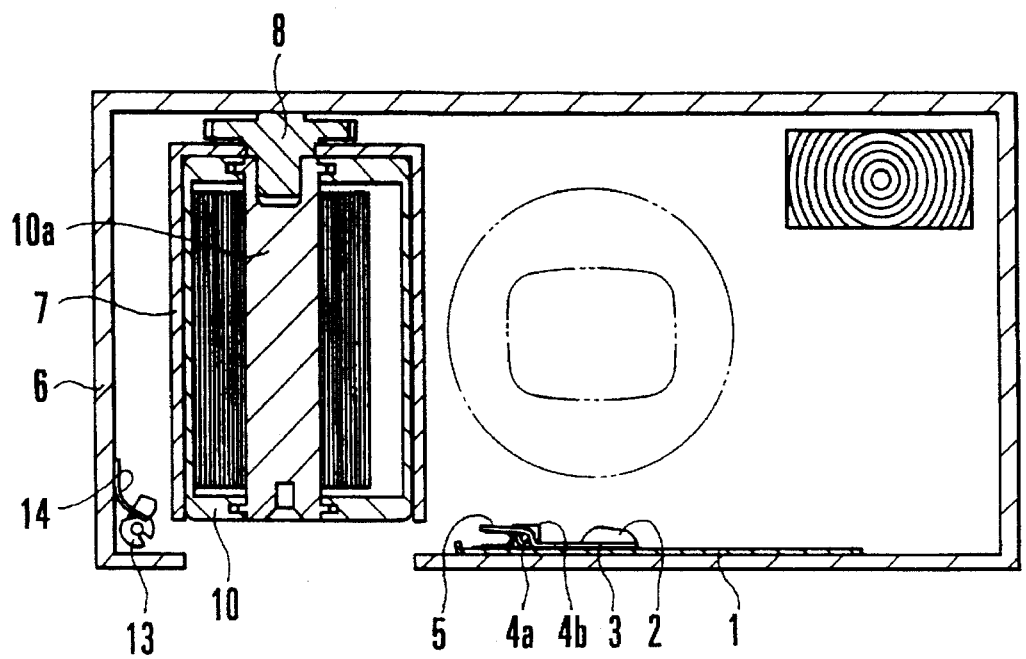
FIGS. 8(a), 8(b) and 8(c) are sectional views of the camera shown in FIG. 7.

When the camera is in a state of having its cartridge chamber open as shown in FIG. 8(a), the upper end of the spool 10a of the cartridge 10 is inserted into the fork 8 until its reaches an engaging position.

Figure 8B:
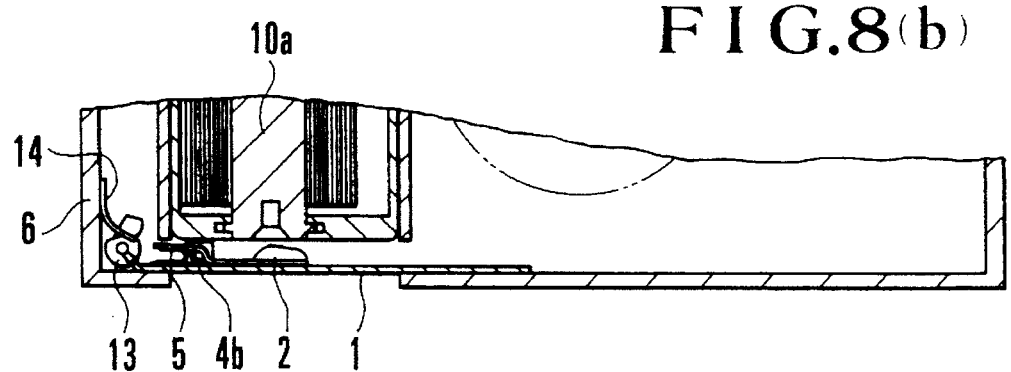

When the cartridge chamber lid 1 is moved from the state of FIG. 8(a) in the direction of closing the cartridge chamber 7, the cartridge chamber 7 comes to be half open in the state of FIG. 8(b). With the cartridge chamber lid 1 in the cartridge chamber half-open position, the fore end of the cartridge chamber lid 1 abuts on the swinging member 13 which is disposed at a closed end of a cartridge chamber lid moving groove provided in the camera body 6. The swinging member 13 is, at this time, held by the elastic locking member 14 which is made of a metal leaf spring in a standby position, i.e. the first locking position, where the swinging member 13 is not pushing the lever member 3. The lever member 3 is also held by the urging spring 5 in a standby position (the first locking position) within the cartridge chamber 7.

Figure 8C:
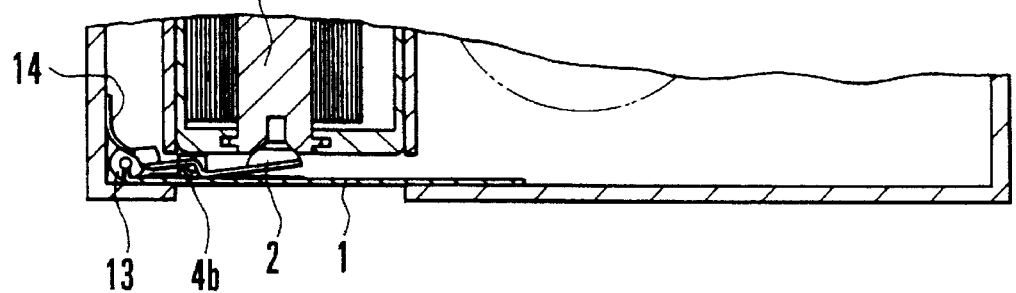

When the cartridge chamber lid 1 is further moved in the closing direction, the lid 1 comes to a cartridge chamber closing position as shown in FIG. 8(c). In the cartridge chamber closing state shown in FIG. 8(c), the fore end of the cartridge chamber lid 1 pushes the swinging member 13. The pushing action causes the swinging member 13 to swing to be locked in the second locking position by the elastic locking member 14. An arm part of the swinging member 13 then pushes the lever member 3, as shown in FIG. 8(c), to cause the lever member 3 to swing from the first locking position on the cartridge chamber lid 1 to the second locking position in which the cartridge axis defining projection part 2 enters into the lower end of the spool 10a. In other words, since the cartridge axis defining part 2 is in one unified body with the lever member 3, the ascent of the lever member 3 causes the cartridge axis defining projection part 2 to temporarily abut on the bottom face of the film cartridge 10. After that, the further movement of the cartridge chamber lid 1 causes the cartridge axis defining projection part 2 to slide over the bottom face of the film cartridge 10 to a vary small extent in a state of being pushed against the film cartridge 10 until it comes to engage the lower end of the spool 10a.

In opening the cartridge chamber lid 1, the fore end part of the cartridge chamber lid 1 hooks the swinging member 13 to move it from the second locking position to the first locking position. Other parts of the cartridge chamber lid opening action are carried out to shift the state of FIG. 8(c) to the state of FIG. 8(a) through the state of FIG. 8(b). The arrangement effectively prevents the cartridge axis defining projection part 2 from damaging the bottom face of the cartridge 10 like in the cases of the first and second embodiments.

The fifth embodiment is thus arranged to enhance the accuracy of position of the spool 10a within the camera by utilizing the driving extent of the cartridge chamber lid 1 after the lever member 3 disposed on the cartridge chamber lid 1 abuts on the swinging member 14.

FIG. 9 is a partly look-through oblique view of a camera arranged as a sixth embodiment of this invention.

Referring to FIG. 9, a cartridge chamber lid 1 is arranged to be slidingly driven within a camera body 6 to open and close a cartridge chamber 7 of the camera which is arranged to have a film cartridge placed therein. A leaf spring member 16 is made of an elastic metal material. A fork 8 is arranged, as a part of film transport means, to drive a spool of the film cartridge.

The cartridge chamber 7 is arranged to be opened and closed by driving within the camera body 6 the cartridge chamber lid 1 to slide. When the camera is loaded with the film cartridge which is not shown, the film cartridge is inserted into the cartridge chamber until the upper end of the spool of the film cartridge comes to engage the fork 8.

When the cartridge chamber lid 1 is moved either by hand or by means of a motor in the direction of closing the cartridge chamber 7, the leaf spring member 16 which is disposed on the cartridge chamber lid 1 slides over the bottom face of the film cartridge while charging the bottom face of the film cartridge with pressure. When the cartridge chamber lid 1 is completely closed, the film cartridge is carried by the fork 8 on the upper end of its spool 8. The lower end (bottom) face of the cartridge is, on the other hand, kept in a state of being pushed by the leaf spring member 16. Therefore, the film cartridge can be accurately kept in position within the camera.

In opening the cartridge chamber lid 1, the lid is opened with the leaf spring member 16 reversely sliding over the bottom face of the film cartridge.

In the case of the sixth embodiment, the leaf spring member 16 is almost constantly in a charged state while the cartridge chamber lid 1 is in process of driving. Therefore, compared with the first to fifth embodiments described in the foregoing, the cartridge chamber lid 1 can be driven with a more uniform and stable torque. It is another advantage of the sixth embodiment that its arrangement permits reduction in number of parts.

FIG. 10 is a partly look-through oblique view of a camera which is arranged as a seventh embodiment of this invention. In FIG. 10, parts arranged in the same manner as those of the first to seventh embodiments are indicated by the same reference numerals.

Referring to FIG. 10, the illustration includes a cartridge chamber lid 1, a cartridge axis defining projection part 2, a piezoelectric element 17 which has the cartridge axis defining projection part 2 disposed at its end part and has an amplitude amplifying function, a microcomputer 18, switches 19a and 19b which are arranged to detect the open and closed positions of the cartridge chamber lid 1, external operation switches 20a and 20b which are provided for opening and closing the cartridge chamber 7 from outside, a motor 21 which is arranged to drive the cartridge chamber lid 1, and a driving gear 22.

The piezoelectric element 17 is arranged on the cartridge chamber lid 1 to have the cartridge axis defining projection part 2 protruding from the cartridge chamber lid 1 when the element 17 is not energized and to bring the cartridge axis defining projection part 2 to a retracted position when the element 17 is energized. The cartridge chamber lid 1 is arranged to be slidable to open and close the cartridge chamber 7 by operating the external operation switches 20a, and 20b through the driving motor 21 and the driving gear 22 which are disposed within the camera body 6.

The illustration further includes the camera body 6, the cartridge chamber 7 of the camera, a motor 30 which is arranged as a part of film transport means which is disposed within the camera, and a fork 8 arranged to receive a driving force from the motor 30 and to drive a spool disposed within a film cartridge which is not shown.

Figure 11:
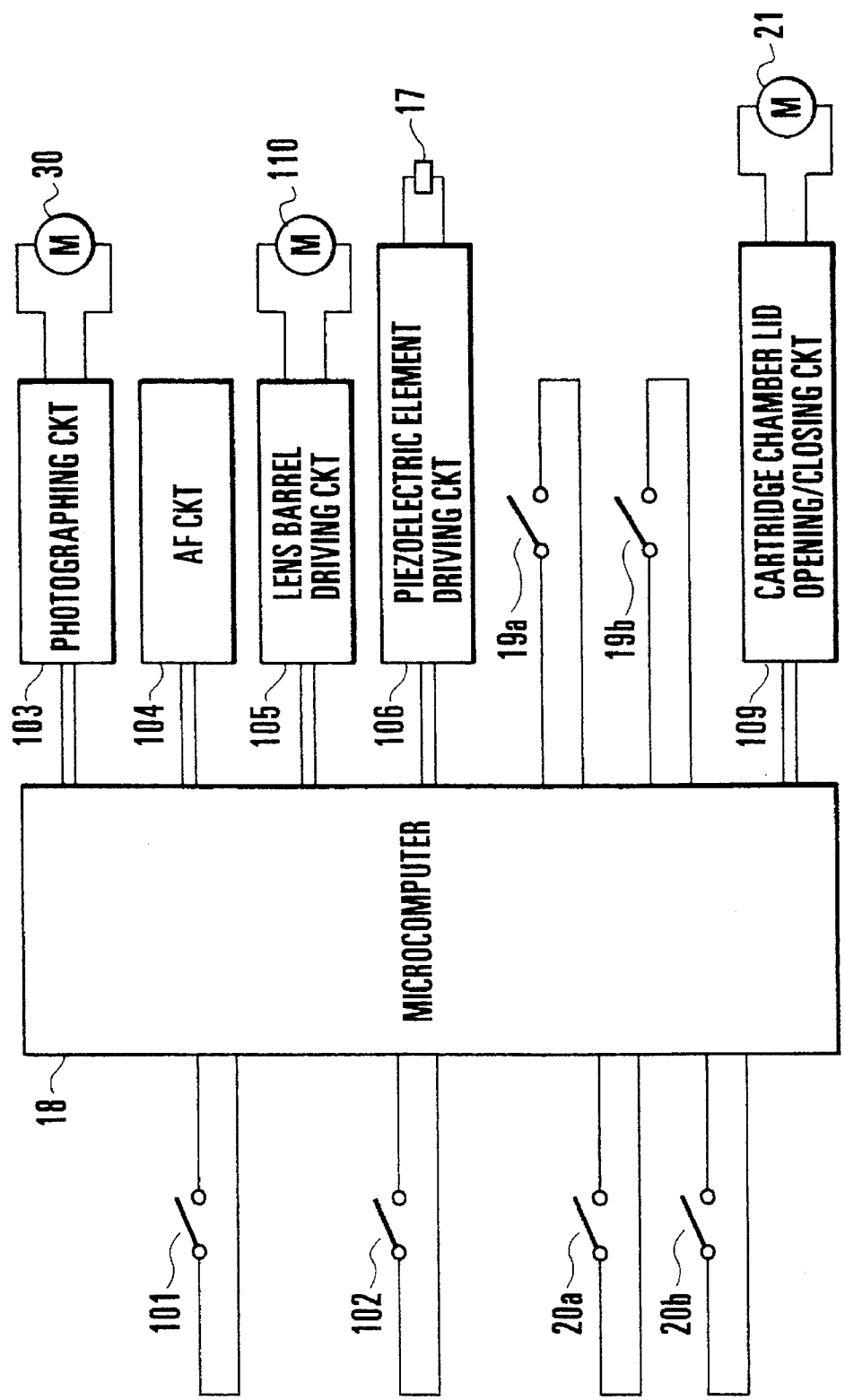
FIG. 11 is a block diagram showing the circuit arrangement of the camera shown in FIG. 10.

FIG. 11 is a block diagram showing in outline the circuit arrangement of the camera (seventh embodiment) arranged as shown in FIG. 10 and as described above. The illustration includes the microcomputer 18, a main switch 101, a release switch 102 and a photographing circuit 103. The photographing circuit 103 includes a driving circuit is arranged to drive a shutter, a diaphragm and the film transport motor 30. An automatic focusing (AF) circuit 104 is arranged to measure a distance to an object to be photographed. A lens barrel driving circuit 105 which is arranged to drive a motor 110 for drawing out a photo taking lens barrel and for focus adjustment. A piezoelectric element driving circuit 106 is arranged to drive the piezoelectric element 17 having the projection part 2 which is arranged to define the axis of a spool disposed within the film cartridge. The illustration further includes the external operation switches 20a and 20b which are provided for causing the cartridge chamber lid 1 to open and close from outside and the cartridge chamber lid opening and closing position detecting switches 19a and 19b which are arranged to detect the moving positions of the cartridge chamber lid 1. A cartridge chamber lid opening/closing circuit 109 is arranged to drive the motor 21 which is arranged to drive cartridge chamber lid 1 to open or to close.

Figure 12:
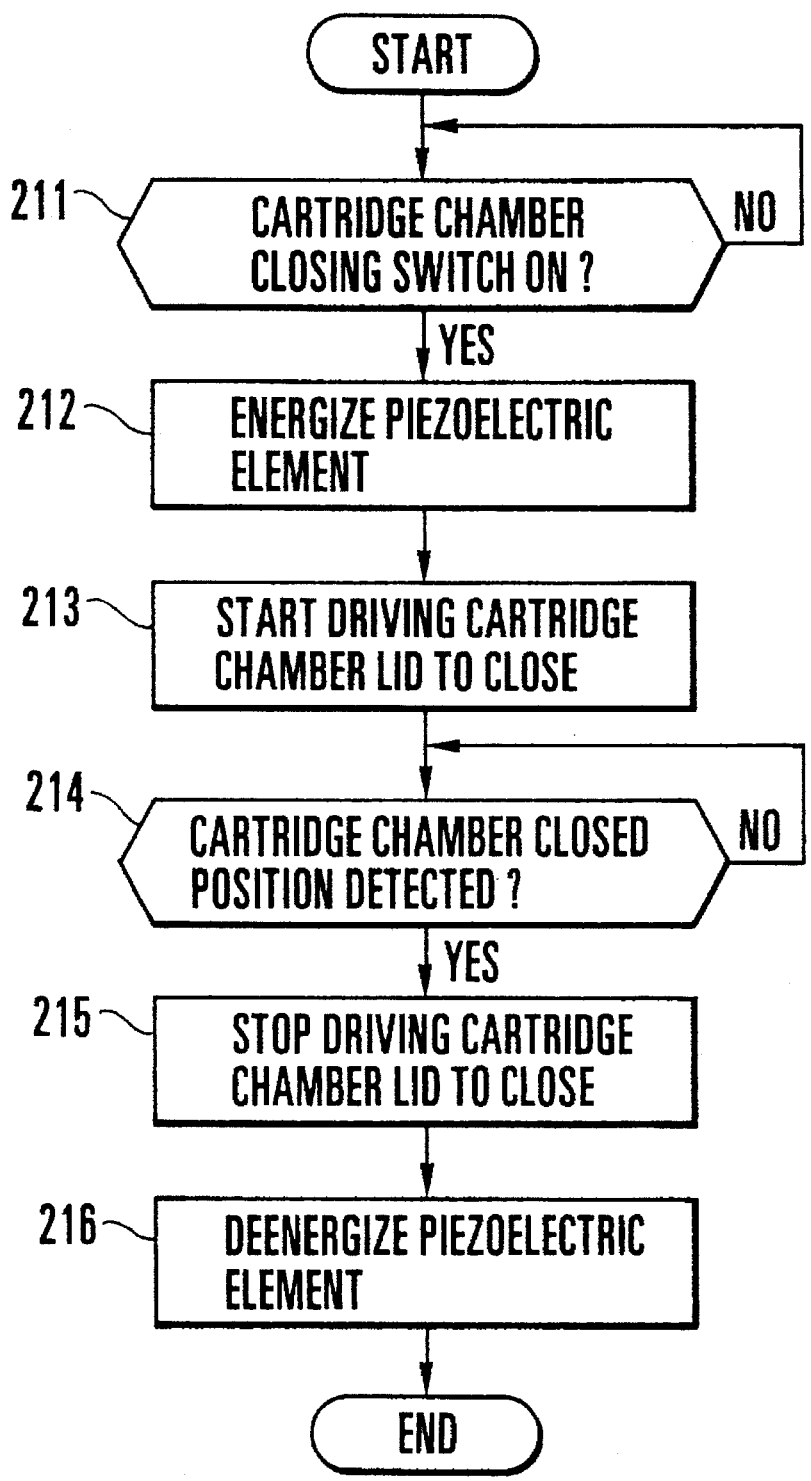
FIG. 12 is a flow chart showing the operation of the main parts of the camera of the seventh embodiment.
Figure 13:
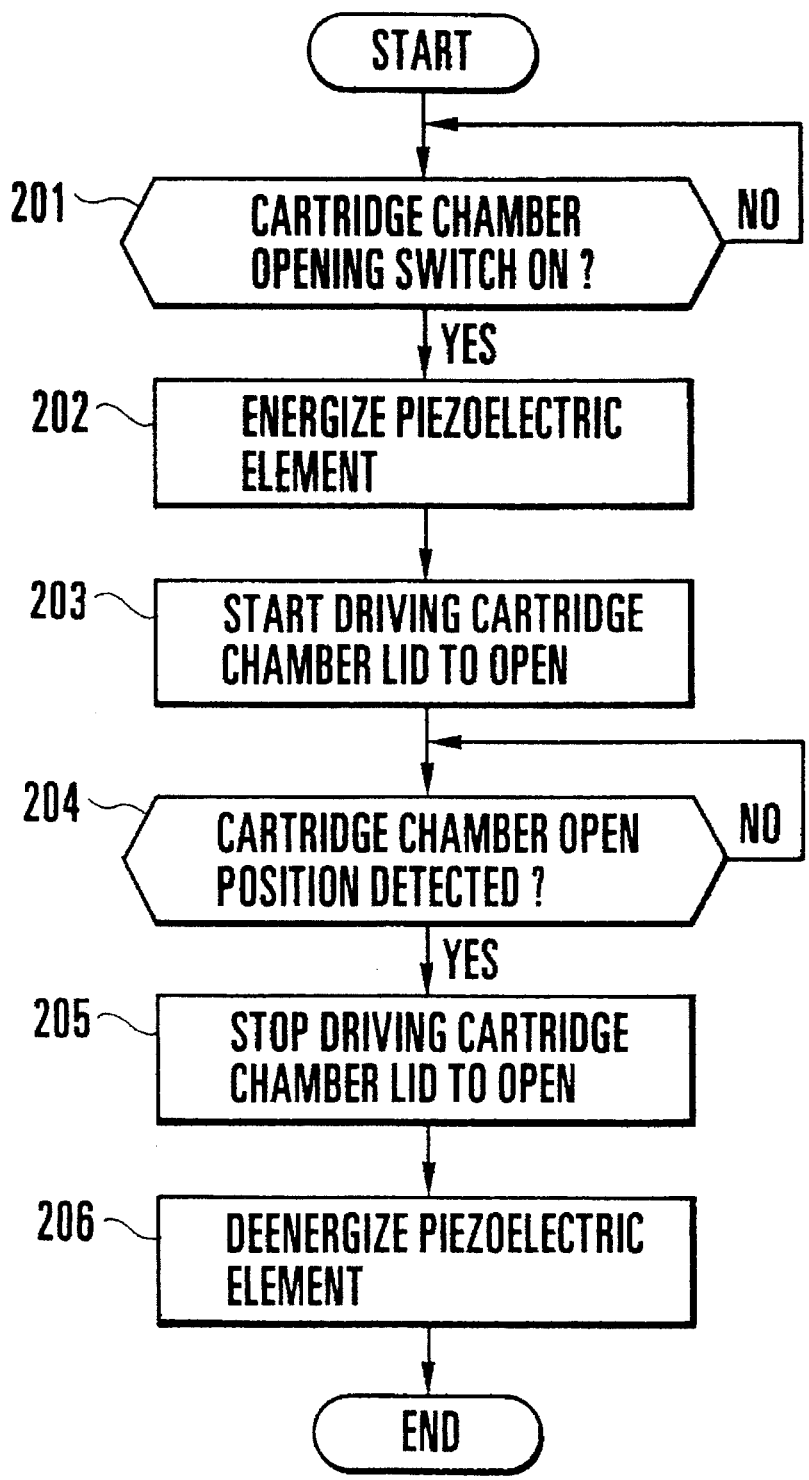
FIG. 13 is a flow chart showing the operation of the main parts of the camera of the seventh embodiment.

FIGS. 12 and 13 are flow charts showing the flow of control to be executed by the microcomputer 18 of FIG. 11. The operation of the seventh embodiment is described below with reference to these flow charts.

A film cartridge is inserted into the cartridge chamber 7 and the upper end of the spool disposed within the film cartridge is caused to engage the fork 8. At a step S211, when the camera operator turns on the cartridge chamber closing switch 20b, a cartridge chamber closing signal is transmitted to the microcomputer 18. The flow then comes to a step S211. At the step S211, the microcomputer 18 causes the piezoelectric element driving circuit 106 to energize the piezoelectric element 17. The amplitude of the piezoelectric element 17 is amplified to cause the cartridge axis defining projection part 2 which is disposed at the end of the piezoelectric element 17 to be lifted up to a retracted position on the cartridge chamber lid 1. The flow of control comes to a step S213.

At the step S213, the cartridge chamber lid opening/closing circuit 109 is caused to energize the motor 21 for driving the cartridge chamber lid 1 to move from an open position to a closed position through the driving gear 22. Then, since the cartridge axis defining projection part 2 is in its retracted position, the part 2 does not slide over the bottom face of the cartridge while the lid 1 is moving. At a step S214, a check is made to find if the switch 19b has been pushed to turn on by the fore end of the cartridge chamber lid 1. If so the flow comes to a step S215. At the step S215, with the cartridge chamber lid 1 assumed to have been completely closed, the microcomputer 18 causes the motor 21 to stop driving. At a step S216, the piezoelectric element 17 is deenergized. This causes the cartridge axis defining projection part 2 to protrude to a position where the axis of the spool of the cartridge is defined by this part 2.

In opening the cartridge chamber lid 1 from the above-stated closed state, the embodiment operates as shown in FIG. 13. Referring to FIG. 13, at a step S201, when the operator turns on the cartridge chamber opening switch 20a, a cartridge chamber opening signal comes to the microcomputer 18. At a step S202, the microcomputer 18 causes the piezoelectric element driving circuit 106 to energize the piezoelectric element 17. The amplitude of the piezoelectric element 17 is then amplified to cause the cartridge axis defining projection part 2 disposed at the end of the element 17 to be lifted up to the retracted position on the cartridge chamber lid 1.

At a step S203, the cartridge chamber lid opening/closing circuit 109 is caused to energize the motor 21 for driving the cartridge chamber lid 1. The cartridge chamber lid 1 is driven through the driving gear 22 from its closed position to an open position. Since the cartridge axis defining projection part 2 is in the retracted position, this part 2 does not slide over the bottom face of the cartridge while the lid is moving. At a step S204, a check is made to find if the cartridge chamber lid opening switch 19a has been pushed to turn on by the fore end of the cartridge chamber lid 1. If so, the flow comes to a step S205. At the step S205, the microcomputer 18 assumes that the cartridge chamber lid 1 has been completely opened and causes the motor 21 to stop driving the cartridge chamber lid 1. At a step S206, the piezoelectric element 17 is caused to be deenergized. As a result, the film cartridge becomes extractable.

The seventh embodiment is thus arranged to restrict and enhance the accuracy of position within the camera of the spool of the film cartridge by moving back and forth the cartridge axis defining projection part 2 by means of an electric actuator which is disposed on the cartridge chamber lid 1.

Compared with the first to sixth embodiments described in the foregoing, the arrangement of the seventh embodiment ensures stable movement of the cartridge chamber lid 1 with less amount of load imposed in driving the cartridge chamber lid 1. It is another advantage of the seventh embodiment that the cartridge is less likely to be damaged as the cartridge axis defining projection part 2 never slides over the bottom face of the cartridge.

Figure 14:
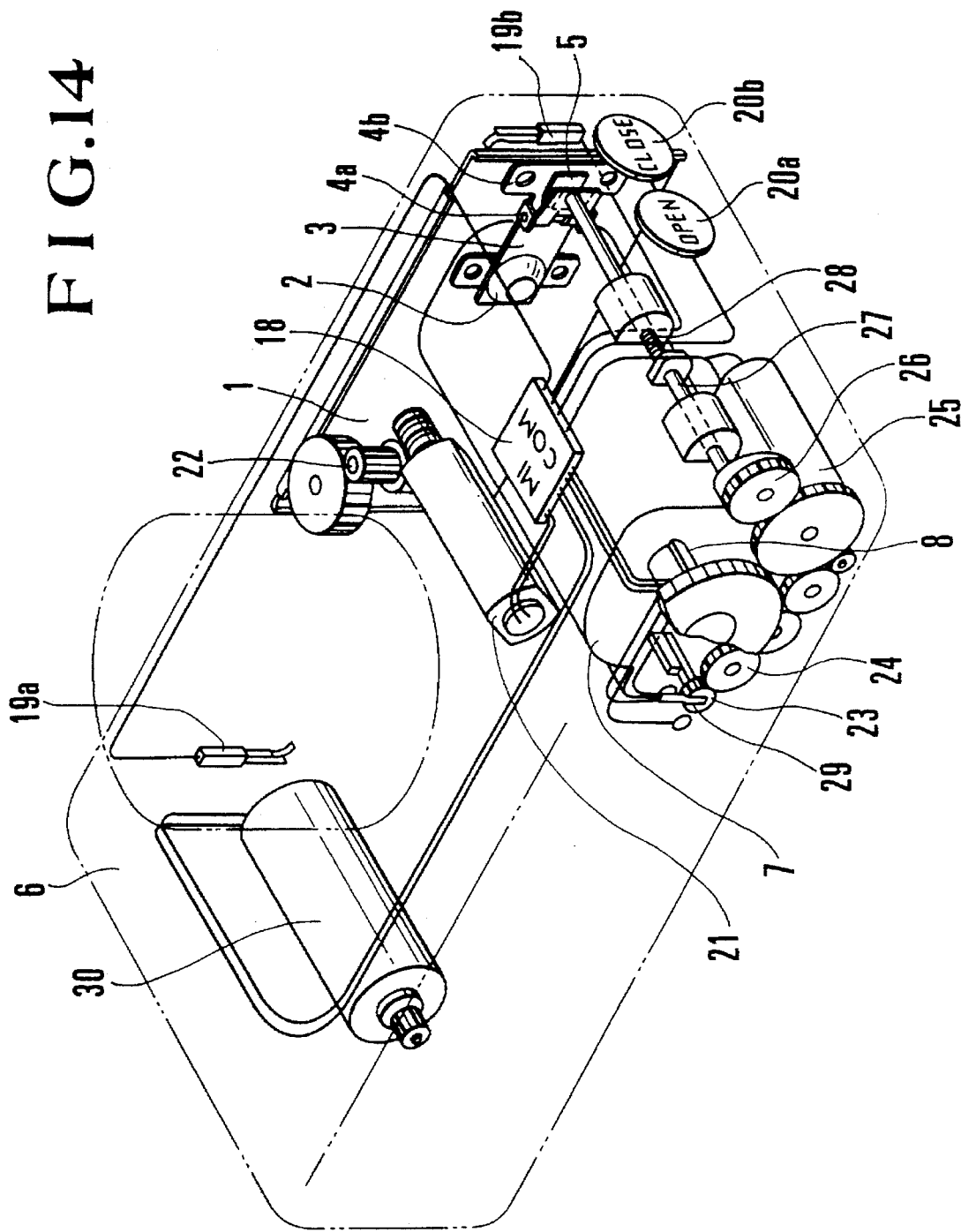
FIG. 14 is a partly look-through oblique view of a camera which is an eighth embodiment of this invention.

FIG. 14 is a partly look-through oblique view of a camera arranged as an eighth embodiment of this invention. In FIG. 14, parts arranged in the same manner as those of the first to seventh embodiments are indicated by the same reference numerals.

Referring to FIG. 14, the illustration includes a cartridge chamber lid 1, a cartridge axis defining projection part 2, a lever member 3 which is made of an elastic metal material, a support bar 4a, a support base 4b, an urging spring 5, a camera body 6, a cartridge chamber 7 of the camera, a cartridge lid opening/closing engaging member 23, a cartridge lid driving gear 24, a cartridge lid driving motor 25, a rotary cam tube 26 which is interlocked with the cartridge lid driving gear 24, a pushing pin 27, a spring 28 which urges the pushing pin 27 into pressed contact with the rotary cam tube 26, a switch 29 arranged to detect the opening and closing positions of the cartridge lid opening/closing engaging member 23, switches 19a and 19b arranged to detect the open and closed positions of the cartridge chamber lid 1, switches 20a and 20b for opening and closing the cartridge chamber 7, a motor 21 for driving the cartridge chamber lid 1, a driving gear 22, a microcomputer 18, a motor forming a part of film transport means disposed within the camera, and a fork 8 which is a part of the film transport means disposed within the camera and is arranged to drive a spool which is disposed within a film cartridge.

Figure 15:
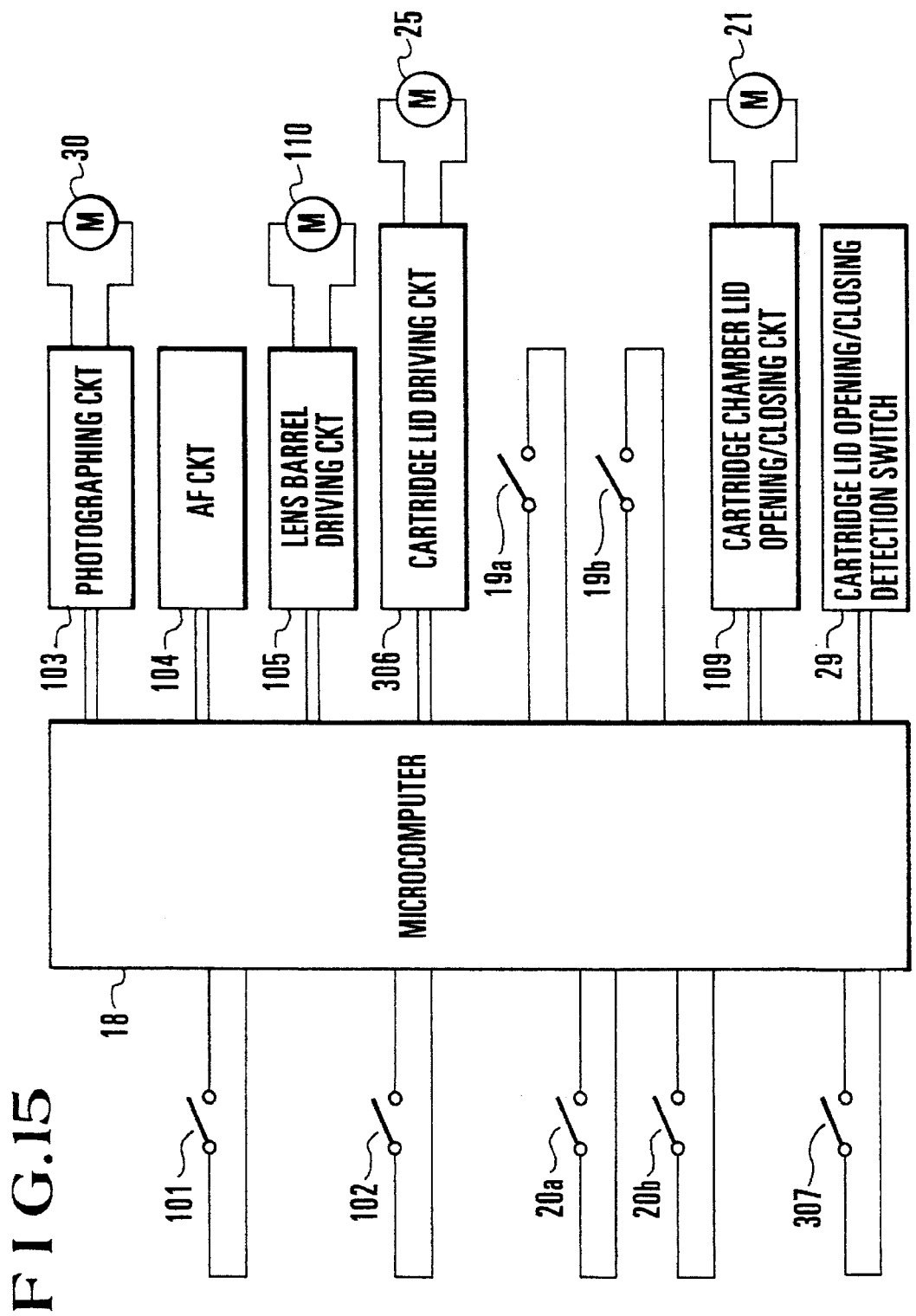
FIG. 15 is a block diagram showing the circuit arrangement of the camera shown in FIG. 14.

FIG. 15 is a block diagram showing the circuit arrangement of the camera which is arranged as described above.

The illustration includes the microcomputer 18, a main (power supply) switch 101, a release switch 102, a photographing circuit 103 including driving circuits for driving a shutter, a diaphragm and the above-stated film transport motor 30, an automatic focusing (AF) circuit 104 arranged to measure a distance to an object to be photographed, a lens barrel driving circuit 105 arranged to drive a motor 110 for drawing out a photo taking lens barrel and for focus adjustment, a cartridge lid driving circuit 306 for driving a cartridge lid opening/closing motor 25 and a cartridge lid opening/closing engaging member 23, switches 20a and 20b for opening and closing the cartridge chamber lid 1, cartridge chamber lid opening and closing position detecting switches 19a and 19b for detecting the moving positions of the cartridge chamber lid 1, a driving circuit 109 arranged to drive the motor 21 for opening and closing the cartridge chamber lid 1, a cartridge lid opening/closing position detecting switch 29 for detecting the open and closed positions of the cartridge lid and a switch 307 which is provided for detecting the presence or absence of the film.

Figure 17:
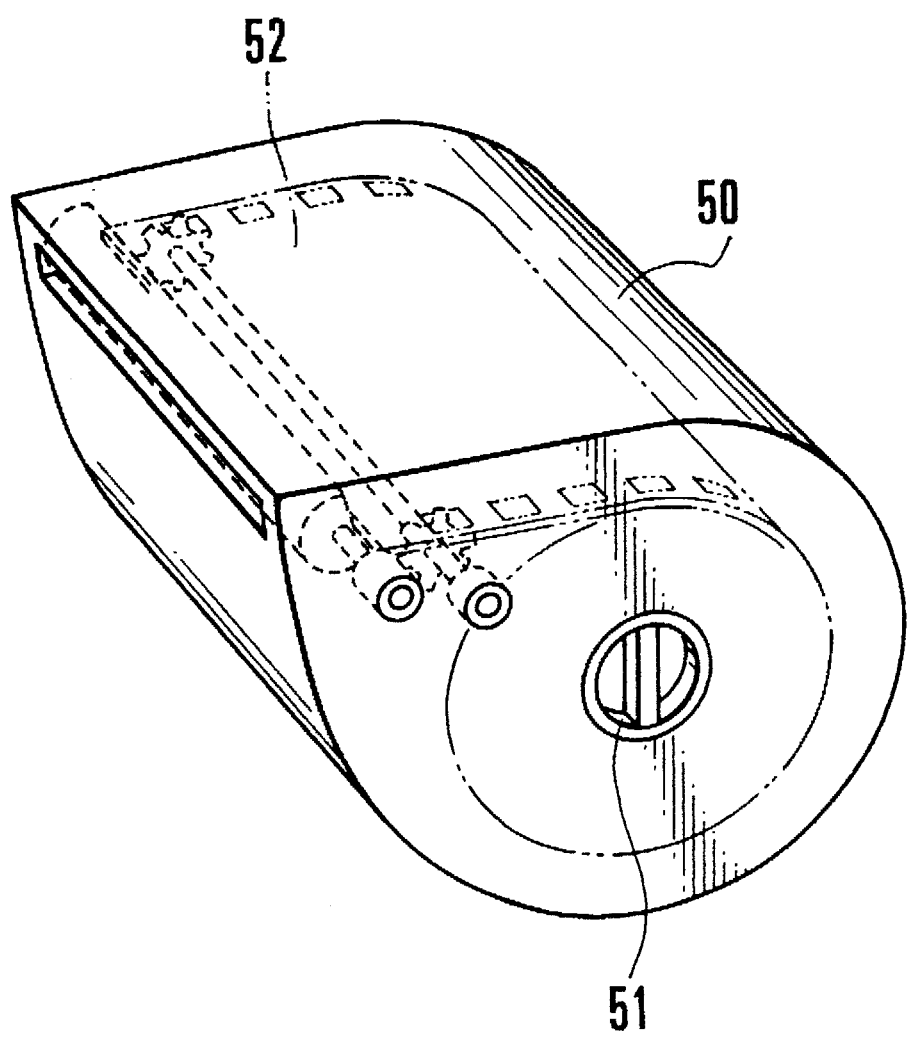
FIG. 17 is an oblique view showing an example of the conventional film cartridge.
Figure 18:
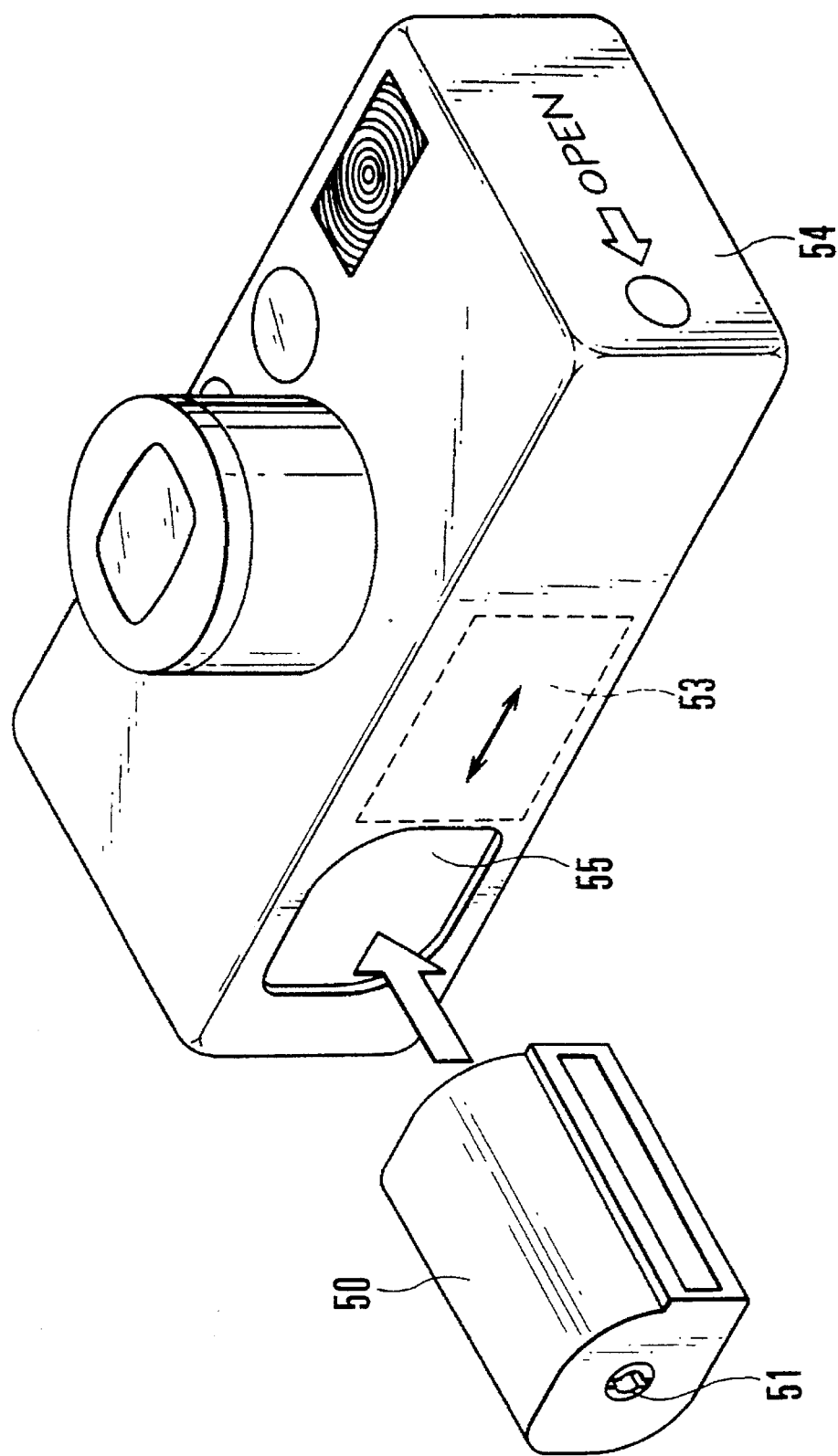
FIG. 18 is an oblique view showing a problem existing relative to loading the conventional camera with the conventional film cartridge shown in FIG. 17.

The term "cartridge lid" as used in describing the eighth embodiment herein means a light-blocking door which can be opened and closed and arranged to shield from light a film inlet/outlet of the cartridge which contains a film with the leader part of the film completely placed within the cartridge as shown in FIG. 17.

Therefore, after the film cartridge of this type is loaded on the camera and shielded from light by the cartridge chamber lid 1, the cartridge lid must be rotated from a light-blocking position to an open position by means of the above-stated cartridge lid engaging member 23 which engages the cartridge lid, before commencement of a film transporting action.

In taking out the film cartridge from the camera, the film is first rewound completely back into the cartridge. Then, before the cartridge is taken out from the cartridge chamber by opening the cartridge chamber lid 1, the cartridge lid must be rotated from the open position back to the light-blocking position.

Figure 16A:
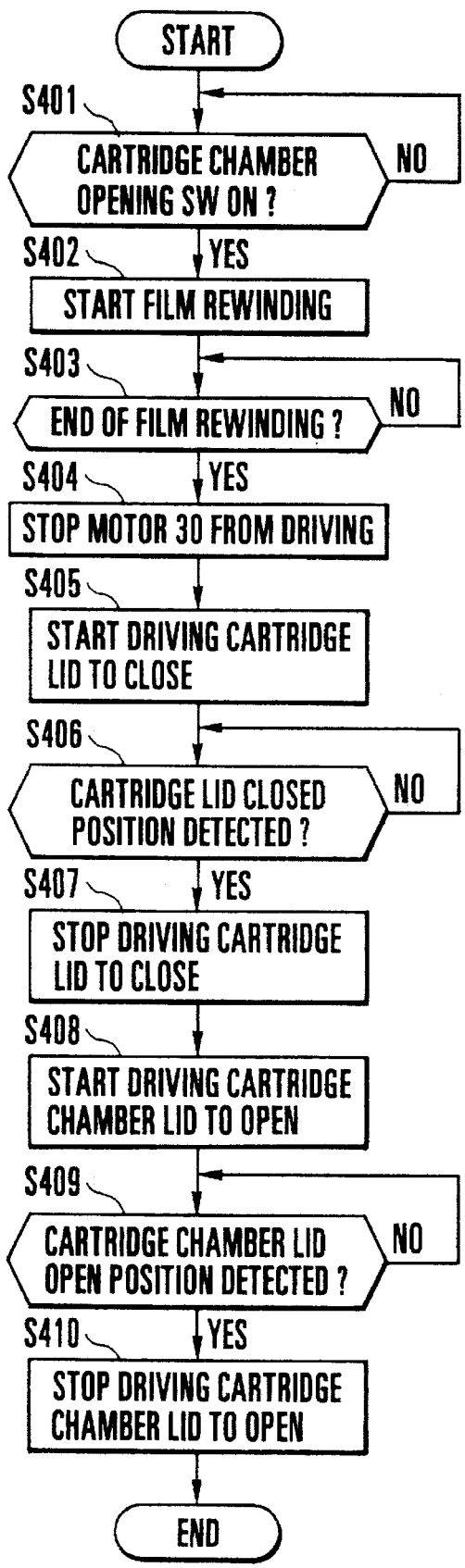
FIGS. 16(a) and 16(b) are flow charts showing the operation of the main parts of the camera of the eighth embodiment.
Figure 16B:
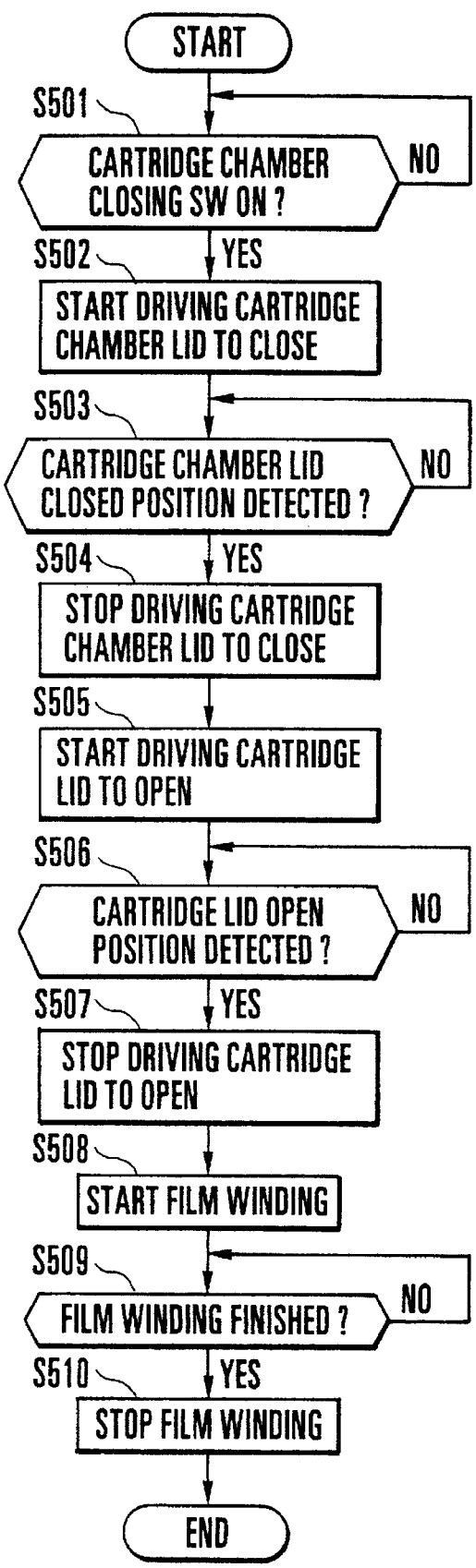

FIGS. 16(a) and 16(b) are flow charts showing the flow of control operation to be executed by the microcomputer 18 of the eighth embodiment arranged as shown in FIG. 15 and as described above.

The cartridge chamber lid is assumed to be in a completely closed state as shown in FIG. 14. Under this condition, the upper end of the spool disposed within the film cartridge and the cartridge lid completely engage the fork 8 and the cartridge lid engaging member 13.

In opening the cartridge chamber lid 1 in this state, the flow of control is executed as shown in FIG. 16(a). At a step S401, when the cartridge chamber opening switch 20a is turned on by the operator, the microcomputer 18 detects it. In case where the leader part of the film is located outside of the film cartridge the flow comes to a step S402. At the step S402, the film begins to be forcibly rewound. For this action, the cartridge chamber opening switch 20b may be arranged not to be operable unless something like a forced rewinding button which is not shown is pushed. The photographing circuit 103 is caused to carry out the film rewinding action by driving the motor 30 as an actuator to rotate the fork 8 through a gear train which is not shown.

At a step S403, a check is made for the state of the film presence/absence detecting switch 307 to find if the film leader part has been completely rewound back into the film cartridge. If so, the flow comes to a step S404 to stop the motor 30 from driving. At a step S405, the cartridge lid which is provided on the film cartridge is moved in the direction of closing it.

The cartridge lid closing action is carried out by causing the driving circuit 306 to drive the motor 25 to rotate in such as way as to move the cartridge lid engaging member 23 to a cartridge lid closing position through the cartridge lid driving gear 24, etc. The motor 25 is thus rotated while its position is detected by means of the cartridge lid position detecting switch 29.

For this purpose, the cam gear 26 also acts in association with the cartridge lid driving gear 24. The pushing pin 27 moves upward away from the lever member in a state of being pushed against the cam face of the cam gear 26 by the spring 28. The pushing pin is completely detached from the lever member 3 before the cartridge lid engaging member 23 rotates round to its cartridge lid closing position.

When the pressure of the pushing pin 27 on the lever member 3 is removed by the rotation of the cam gear 26 caused by the driving action of closing the cartridge lid as mentioned above, the cartridge axis defining projection part 2 is moved down to its initial position (first position) by the force of the urging spring 5. At a step S406, a check is made for the state of the cartridge lid position detecting switch 29 to find if the cartridge lid has been completely closed. If so, the flow comes to a step S407 to stop the driving action on the cartridge lid engaging member 23. At a step S408, the driving circuit 109 is caused to drive the motor 21 to open the cartridge chamber lid 1. The cartridge chamber lid 1 is driven with the driving force of the motor 21 transmitted through the driving gear 22, etc., to a rack part of the cartridge chamber lid 1. At this time, the cartridge axis defining projection part 2 does not touch nor slide over the surface of the cartridge as the part 2 has already been retracted to its first position by then. At a step S409, a check is made for the state of the switch 19a to find if the cartridge chamber lid has been opened. If so, the flow comes to a step S410 to stop the supply of power to the motor 21.

Next, assuming that the film cartridge is loaded on the camera in a state of completely engaging the fork gear 8 and the engaging member 23 and that the cartridge chamber lid 1 is found to be in its open position at a step S501, the embodiment operates as follows.

In case where the cartridge chamber lid 1 is to be closed under this condition, the operator turns on the cartridge chamber closing switch 20b. At the step S501, this state is detected by the microcomputer 18. The flow of control operation then comes to a step S502. At the step S502, the driving circuit 109 is caused to energize the motor 21. The motor 21 then drives, via the driving gear 22, etc., the rack provided on the cartridge chamber lid 1 to move the lid 1 toward its closed position. The cartridge axis defining projection part 2 is placed in its retracted position by the force of the urging spring 5 and, therefore, never comes in touch with the surface of the cartridge in this instance.

At a step S503, a check is made for the state of the detecting switch 19b to find if the cartridge chamber lid 1 has been completely closed. If so, the flow comes to a step S504. At the step S504, the microcomputer 18 causes the motor 21 to be deenergized. At a step S505, the driving circuit 306 is caused to switch the supply of power to the other motor 25. The motor 25 then causes, via the cartridge lid driving gear 24, etc., the cartridge lid engaging member 23 to rotate. The motion of the member 23 then causes the lid of the cartridge to move round to its closed position to an open position where the film can be moved out of or into the cartridge. During this process, the cam gear 26 which is interlocked with the cartridge lid engaging member 23 rotates to push down the pushing pin 27 from its retracted position to a position where it pushes the lever member 3. The pushing force of the pushing pin 27 then causes the lever member 3 to swing to move the cartridge axis defining projection part 2 upward. The projection part 2 then comes to engage and push one end face of the stool of the cartridge. At a step S506, when the open position of the cartridge lid is detected by means of the detecting switch 29, the flow comes to a step S507. At the step S507, the microcomputer 18 stops the supply of power to the motor 25.

After that, at steps S508, S509 and S510, the film is wound up to a photographing start position.

In the case of the eighth embodiment, the cartridge axis defining projection part 2 which is on the cartridge chamber lid is moved back and forth according to the opening and closing movement of the cartridge lid in such a way as to enhance the accuracy of position of the spool of the cartridge within the camera.

Therefore, like in the case of the seventh embodiment, the cartridge chamber lid can be driven under a less amount of load then in the cases of the first to sixth embodiments. The cartridge chamber can be smoothly opened and closed, because the cartridge axis defining projection part does not come in touch with the film cartridge while the cartridge chamber lid is being driven. Further, while this embodiment is arranged to use the motor 25 as an actuator for the cartridge lid engaging member 23, the cartridge lid engaging member may be arranged to be manually moved or to be moved by an elastic force of a spring or the like.

In each of the embodiments described, one end face of the cartridge or one end of the spool of the cartridge is arranged to be supported by a member disposed on the cartridge chamber lid which moves approximately in parallel to the end face (bottom surface) of the cartridge after the camera is loaded with the cartridge. Therefore, the cartridge can be accurately kept in position within the camera. In case where the cartridge is of the kind necessitating thrust feeding of film, for sending the film out of the cartridge, the arrangement enables the camera to correctly send out the film toward the aperture of the camera without any warping. If the film contained in the cartridge is of the kind permitting magnetic writing or reading on or from the film, the invented arrangement ensures that the film can be fed to a magnetic head at a correct azimuth angle.

Further, the arrangement to elastically or resiliently carry the cartridge within the camera effectively prevents the cartridge from being caused to be vertically rattled, displaced, pulled out from the fork gear, or to have axial slanting of its spool by a falling impact of the camera or the like of the camera.

This invention of course applies also to a camera other than the camera of the kind arranged to close and open the cartridge chamber by sliding its lid approximately in parallel to the end face of the cartridge loaded on the camera.

This invention also applied to any cases where the cartridge loading direction and the cartridge loading manner differ from those of the embodiments described.

This invention is applicable also to a cartridge of a type which differs from the type of the cartridge to be used by the embodiments described, or to a cartridge containing an image recording medium other than a film, to a different kind of a cartridge, or even to some loading matter other than a cartridge such as a battery.

Further, while the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Further the individual components shown in schematic or block form in the drawings are all well-known in the camera arts and their specific construction and operation are not critical to the operation or best mode for carrying out the invention.

Further the invention can be practiced by arranging the embodiments or their technological elements in combination as desired.

Further the invention applies also to an apparatus which consists of the components of the embodiments described either in their entirety or in part. The embodiments may be combined with some other apparatus or may be employed as a component of the apparatus.

Further the invention is applicable to cameras of varied kinds such as a single-lens reflex camera, a lens-shutter type camera, and a video camera, to an optical apparatus or some other apparatus other than a camera and to a device or an element that is employed as a component of a camera, an optical apparatus or some other apparatus.

What is claimed is:

1. A camera adapted to use a film cartridge comprising:
  a) a first device which supports the film cartridge placed in the cartridge chamber, said first device being arranged on a slidable cover of a cartridge chamber; and
  a second device which prevents said first device from hindering a sliding action of said cover because of the film cartridge placed in the cartridge chamber.

2. A camera according to claim 1, wherein said second device is electrically energizable to prevent movement of said first device.

3. A camera according to claim 2 wherein said camera further includes sensor means for detecting positions of said cover and control means for energizing said second device selectively in response to output signals of said sensor means.

4. A camera according to claim 2, wherein said second device is a piezoelectric element.

5. A camera according to claim 3, wherein said second device is a piezoelectric element.

6. A camera according to claim 1, wherein said first device includes a support member which supports a spool of the film cartridge placed in the cartridge chamber.

7. A camera according to claim 1 wherein said first device includes a slide member which slides with the cover.

8. A camera according to claim 7, wherein said second device includes means for preventing the film cartridge placed in the cartridge chamber from hindering the sliding of the slide member.

9. A camera according to claim 7, wherein said second device includes a displacement device which displaces said slide member so as to prevent the film cartridge placed in the cartridge chamber from hindering the sliding of said slide member.

10. A camera according to claim 9, wherein said displacement device includes a motor for displacing said slide member.

11. A camera according to claim 9, wherein said displacement device includes an electric drive device for displacing said slide member.

12. A camera according to claim 9, wherein said displacement device includes an elastic member for displacing said slide member.

13. A camera according to claim 7, wherein said second device includes means for displacing said slide member according to a position of said cover.

14. A camera according to claim 1, wherein said first device is arranged so as to hold said spool of said film cartridge placed in said cartridge chamber together with a spool drive member.

15. A camera adapted to use a film cartridge comprising:
  a) first means arranged on a slidable cover of a cartridge loading chamber to support the film cartridge when the film cartridge is placed in the cartridge loading chamber, said first means being movable axially of the cartridge loading chamber; and
  b) second means for preventing movement of said first means during at least a portion of sliding action of said cover.

16. A camera according to claim 15, wherein said film cartridge includes a spool and wherein said first means is movable to engage an end of said spool.

17. A camera according to claim 15, wherein said second means biases said first means toward said cover.

18. A camera according to claim 16, wherein said second means biases said first means toward said cover.

19. A camera according to claim 17, wherein said camera includes a cam part which overcomes the bias of said second means upon sliding of said cover into closing relation to said cartridge chamber.

20. A camera according to claim 6, wherein said cam part effects said movement of said first means axially of the loaded film cartridge.

21. A camera according to claim 15, wherein said first means comprises a resilient member self-biased away from said cover.

22. A camera according to claim 21, wherein said second means comprises a protruding member of said camera engagable with said first means during said at least a portion of sliding action of said cover.

23. A camera according to claim 21 wherein said resilient member comprises first and second spring members having respective free ends spaced in the direction of sliding action of said cover.

24. A camera according to claim 17, wherein said camera includes a biasing member which engages said second means upon sliding of said cover into closing relation to said cartridge chamber and overcomes the bias of said second means.

25. A camera according to claim 15, further including:
  sensor means for detecting positions of said cover;
  a cartridge lid opening/closing member;
  motive means for operating said cartridge lid opening/closing member; and
  control means for energizing said motive means selectively in response to output signals of said sensor means.

26. A camera adapted to use a film cartridge comprising:
  a) an elongate film cartridge loading chamber in said camera;
  b) a cover supported in said camera for sliding movement into opening and closing relation with said chamber; and c) biasing means arranged interiorly on said cover and defining at least one arcuate spring surface so located as to engage said film cartridge when said film cartridge is fully resident in said chamber and apply bias thereto longitudinally of said chamber.

27. A camera comprising:

(a) a first device for holding a cartridge placed in a cartridge chamber, said first device being movable with a slidable cover of said cartridge chamber; and (B) a second device for preventing said cartridge placed in said cartridge chamber from hindering the slide of said slidable cover of said cartridge chamber owing to the cartridge placed in said cartridge chamber.

28. A camera according to claim 27, wherein said cartridge to be placed in said cartridge chamber includes a cartridge for an image recording medium.

29. A camera according to claim 28, wherein said first device includes a holding member for holding a portion for moving said image recording medium of the cartridge.

30. A camera according to claim 27, wherein said cartridge to be placed in the cartridge chamber includes a film cartridge.

31. A camera according to claim 30, wherein said first device includes a holding member for holding a spool of the film cartridge.

32. A camera according to claim 27, wherein said second device includes a displacement device for displacing said first device so as to prevent the cartridge placed in the cartridge chamber from hindering the movement of a cover of the cartridge chamber.

33. A camera according to claim 32, wherein said displacement device includes a motor for displacing the first device.

34. A camera according to claim 33, wherein said displacement device includes an electric drive device for displacing the first device.

35. A camera according to claim 33, wherein said displacement device includes an elastic member for displacing the first device.

36. A camera according to claim 27, wherein said second device includes means for displacing the first device according to a position of the cover of the cartridge chamber.

37. A camera according to claim 30, wherein said second device is arranged so as to hold the spool of the film cartridge placed in the cartridge chamber together with a spool drive member.

38. A camera, comprising:

(A) a first device for holding a cartridge placed in a cartridge chamber, said first device being movable with a cover of the cartridge chamber;

(B) a second device for preventing said first device from hindering a movement of the cover of the cartridge chamber owing to the cartridge placed in the cartridge chamber; and (C) a third device for restricting the action of the second device when the first device holds the cartridge placed in the cartridge chamber, said third device being arranged in the camera.

39. A camera according to claim 38, wherein said cover of the cartridge chamber is slidably provided.

40. A camera according to claim 38, wherein said cartridge to be placed in the cartridge chamber includes a cartridge for an image recording medium.

41. A camera according to claim 40, wherein said first device includes a holding member for holding a portion for moving the image recording medium of the cartridge.

42. A camera according to claim 41, wherein said cartridge to be placed in the cartridge chamber includes a film cartridge.

43. A camera according to claim 42, wherein said first device includes a holding member for holding a spool of the film cartridge.

44. A camera according to claim 38, wherein said second device includes a displacement device for displacing the first device so as to prevent the first device from hindering the movement of the cover of the cartridge chamber by the cartridge placed in the cartridge chamber.

45. A camera according to claim 44, wherein said displacement device includes a motor for displacing the first device.

46. A camera according to claim 44, wherein said displacement device includes an electric drive device for displacing the first device.

47. A camera according to claim 44, wherein said displacement device includes an elastic member for displacing the first device.

48. A camera according to claim 38, wherein said second device includes means for displacing the first device according to a position of the cover of the cartridge member.

49. A camera according to claim 42, wherein said second device is arranged to hold a spool of the film cartridge placed in the cartridge chamber together with a drive member for the spool.

50. An apparatus adapted to use a film cartridge comprising:

a) a first device which supports the film cartridge placed in the cartridge chamber, said supporting device being arranged on a slidable cover of a cartridge chamber; and b) a second device which prevents said first device from hindering a sliding action of said cover because of the film cartridge placed in the cartridge chamber.

51. An apparatus comprising:

(a) a first device for holding a cartridge placed in a cartridge chamber, said first device being movable with a slidable cover of said cartridge chamber; and (B) a second device for preventing said cartridge placed in said cartridge chamber from hindering the slide of said slidable cover of said cartridge chamber owing to the cartridge placed in the cartridge chamber.

52. An apparatus comprising:

(A) a first device for holding a cartridge placed in a cartridge chamber, said first device being movable with a cover of the cartridge chamber;

(B) a second device for preventing said first device from hindering a movement of the cover of the cartridge chamber owing to the cartridge placed in the cartridge chamber; and (C) a third device for restricting the action of the second device when the first device holds the cartridge placed in the cartridge chamber, said third device being arranged in the camera.

* * * * *

UNITED STATES PATENT AND TRADEMARK OFFICE
CERTIFICATE OF CORRECTION

PATENT NO. : 5,664,249
DATED : September 2, 1997
INVENTOR(S) : Okuno et al.

It is certified that error appears in the above-identified patent and that said Letters Patent is hereby corrected as shown below:

Col. 5, line 15, delete "Leaf" and insert -- leaf --.

Col. 7, line 34, after "the lid" insert -- 1 --.

Col. 8, line 19, delete "which".

Col. 11, line 20, delete "round".

Col. 14, line 34, delete "6" and insert -- 19 --.

Column 8, line 15, insert --which-- before is.

Signed and Sealed this

Twenty-eighth Day of April, 1998

Attest:

BRUCE LEHMAN

Attesting Officer

Commissioner of Patents and Trademarks